United States Statutory Invention Registration [19]

[11] Reg. Number: H874

Suzuki et al. [43] Published: Jan. 1, 1991

[54] PROCESS FOR MANUFACTURING A SILVER HALIDE PHOTOGRAPHIC MATERIAL HAVING A SUPPORT AND AT LEAST ONE HYDROPHILIC COLLOID LAYER

[75] Inventors: Akio Suzuki, Hachioji; Satoru Nagasaki, Hino, both of Japan

[73] Assignee: Konishiroku Photo Industry Co., Ltd., Tokyo, Japan

[21] Appl. No.: 401,566

[22] Filed: Aug. 29, 1989

Related U.S. Application Data

[63] Continuation of Ser. No. 268,686, Nov. 7, 1988, abandoned, continuation-in-part of Ser. No 56,910, Jun 3, 1987, abandoned.

[30] Foreign Application Priority Data

Jun. 4, 1986 [JP] Japan ..... 61-130705

[51] Int. Cl.[5] ..... G03C 1/00; G03C 1/76

[52] U.S. Cl. ..... 430/537; 430/496; 430/539

[58] Field of Search ..... 430/496, 539

[56] References Cited

U.S. PATENT DOCUMENTS

| | | | |
|---|---|---|---|
| 2,296,204 | 9/1942 | Hennessy | 308/80 |
| 2,628,167 | 2/1953 | Overman | 430/608 |
| 2,759,821 | 8/1956 | Jones et al. | 430/631 |
| 2,759,822 | 8/1956 | Jones et al. | 430/613 |
| 3,003,878 | 10/1961 | Illingsworth et al. | 430/640 |
| 3,455,235 | 7/1969 | Koelsch | 100/37 |
| 3,536,491 | 10/1970 | Rees et al. | 430/537 |
| 3,545,971 | 12/1970 | Barnes et al. | 96/61 |
| 3,772,032 | 11/1973 | Pearson et al. | 430/628 |
| 3,775,128 | 11/1973 | Yamamoto et al. | 430/614 |
| 4,126,472 | 11/1978 | Sakai et al. | 430/264 |
| 4,455,365 | 6/1984 | Urata et al. | 430/539 |
| 4,547,445 | 10/1985 | Asahina et al. | 430/539 |
| 4,613,563 | 9/1986 | Murai | 430/539 |

FOREIGN PATENT DOCUMENTS

| | | |
|---|---|---|
| 2296204 | 7/1976 | France . |
| 50-56227 | 5/1975 | Japan . |
| 50-116025 | 9/1975 | Japan . |
| 50-147324 | 11/1975 | Japan . |
| 51-107129 | 9/1976 | Japan . |

*Primary Examiner*—John S. Maples
*Assistant Examiner*—Philip Tucker
*Attorney, Agent, or Firm*—Finnegan, Henderson, Farabow, Garrett & Dunner

[57] ABSTRACT

A silver halide photographic light-sensitive material is disclosed which is excellent in the super-rapid processability. The photographic material comprises a support having thereon at least one hydrophilic colloid layer comprising at least one silver halide emulsion layer. The hydrophilic colloid layer is formed by one or more times of coating provided that wet thickness of the layers coated in each time of coating is within the range of from 35 to 80 $\mu$m, and a total content of gelatin of the whole hydrophilic colloid is in an amount of from 2.20 to 3.10 g/m$^2$. The photographic material is suitable for super-rapid processing by an automatic processor for 20 to 60 seconds.

10 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROCESS FOR MANUFACTURING A SILVER HALIDE PHOTOGRAPHIC MATERIAL HAVING A SUPPORT AND AT LEAST ONE HYDROPHILIC COLLOID LAYER

This application is a continuation of application Ser. No. 268,686, filed Nov. 7, 1988, now abandoned, which is a continuation-in-part of application Ser. No. 07/056,910, filed June. 3, 1987, now abandoned.

FIELD OF THE INVENTION

The present invention relates to a silver halide photographic light-sensitive material, particularly to a silver halide photographic light-sensitive material capable of being super-rapidly processed and, more particularly, to a super-rapidly processable silver halide photographic light-sensitive material which causes little or no trouble in coating, which is highly sensitive, and which is excellent in the graininess as well as in the pressure resistance.

BACKGROUND OF THE INVENTION

In recent years, the consumption of silver halide photographic light-sensitive materials has been and is increasing steadily. Accordingly, the processing number of silver halide photographic light-sensitive materials increases, leading to the demand for even more rapid processing. i.e., for the increase in the processing number of light-sensitive materials per unit time.

The above-mentioned tendency is seen also in the field of light-sensitive materials for X-ray use, for example, medical radiographic films. That is, the significant increase in the number of diagnosis due to the strict observation of periodical medical checks, etc., and the increase in the medical inspection items for the purpose of making the diagnosis even more correct leads to the increase in the number of radiographing films.

On the other hand, there is also the necessity to inform medical examinees of diagnostic results as soon as possible; that is, there are strong demands for more rapid processing than ever before to immediately provide the processed results for the diagnosis. Particularly the angiography, the radiographing carried out in the midst of a surgical operation, and the like, essentially need the viewing of the finished radiographic image in no time.

In order to meet the above wishes of the medical field, it is necessary to further speed up the processing of X-ray films as well as to promote the automation of the diagnostic procedure (including radiographing and transportation).

However, if a rapid processing of a film takes place, it tends to bring about the problems that the film (a) shows an inadequate image density (the sensitivity, contrast and maximum density are deteriorated), (b) is not completely fixed, (c) is not sufficiently washed, and, (d) is not completely dried. And the incomplete fixation and washing of a film casue the film to be discolored during the storage thereof, thus deteriorating the image quality.

One way to solve these problems is to reduce the amount of gelatin. However, the reduction of the amount of gelatin gives rise to various other problems: For example, (1) such troubles as coating marks, coating streaks, etc., tend to appear in the coating of a silver halide photographic light-sensitive material, (2) where the film is rubbed with each other or with other materials, the rubbed part, after being developed, tends to have a higher density than that of the other parts; the so-called scratch darkening, (3) when the film, after being bent, is imagewise exposed and then developed, the bent part tends to have a lower density than that of the other parts; the so-called pressure desensitization, and (4) since a developer solution can permeate and diffuse fast into the layer, the development becomes active, causing the developed silver to become coarse, so that the graininess looks roughened.

It has been so difficult to solve these problems to date that it was unable to reduce the amount of gelatin in conventional films.

The advent of a super-rapid processing system is desired as has been described above. The "super-rapid processing" herein means a processing by an automatic processor of which the total time required for the overall processing from the point of time when the leading end of a film is inserted into the processor and transported through the developer bath, first cross-over rack, fixer bath, second cross-over rack, wash water bath, third cross-over rack, and drying rack up to the time when the trailing end of the film gets out of the drying section in other words, the quotient (sec.) obtained after dividing the whole length of the processing line (m) by the line transport speed (m/sec )]is from 20 seconds to 60 seconds.

The reason why the cross-over time is to be included in the processing time, although well-known to those in the art, is because it is considered that, even in the cross-over passage, the preceding process liquid is present in the gelatin layer to have the processing action substantially go on.

Japanese Patent Examined Publication No. 47045/1976 describes the importance of an amount of gelatin used in rapid processing, wherein the total processing time including the cross-over time is described to be from 60 to I20 seconds. This processing time, however, is unable to satisfy the recent demand for super-rapid processing.

Also, particularly as the medical X-ray checks increase in recent years, the international opinion as well as the medical world demands strongly the reduction of exposure dose. In order to meet this demand, fluorescent intensifying screens, intensifying screens, devices or means such as fluorescent screens, X-ray image intensifiers, etc., are used. The improvement of these devices or means and the increase in the sensitivity of photographic light-sensitive materials for X-ray use in recent years are remarkable. On the other hand, high-precision radiographic technology is demanded for more precise medical checks. Since the larger the amount of X-ray irradiation the higher the precision, a radiographing technique for irradiating a large dose has been developed and a large-capacity X-ray generator has also been developed therefor. However, such the radiographing technique requiring a large dose is unacceptable because it runs rather counter to the foregoing demand for the reduction of exposure dose. Accordingly, the radiographic field requires a high-precision photographing technique which uses a small exposure dose, and therefore longs for the development of a photographic light-sensitive material capable of giving precise images with a small X-ray dose; i.e., a still higher-speed photographic light-sensitive material.

There are a large variety of techniques to increase the speed of a photographic light-sensitive material with its silver halide grain size remaining intact; that is, sensitizing methods. If a proper sensitizing technique is used, a light-sensitive material may be expected to have its speed increased with its grain size remaining as it is; i.e.. with its covering power kept on. Many are reported as the technique, including, e.g., methods of adding to an emulsion a development accelerator such as a thioether, methods for the supersensitization of a spectrally sensitized silver halide emulsion by use of an appropriate combination of sensitizing dyes, techniques of improving optical sensitizers, and the like.

These methods, however, are not always widely usable in high-speed silver halide photographic light-sensitive materials. That is, the silver halide emulsion for high-speed silver halide photographic light-sensitive materials is chemically sensitized to an utmost possible extent, so that, if any of the above methods is applied, a light-sensitive material tends to be fogged during the storage thereof. In addition, in the medical radiographic field, those conventionally used regular type which were sensitive to wavelengths around 450 nm are out-of-date, and are now replaced by orthochromatic-type light-sensitive materials sensitive to wavelengths of from 540 to 550 nm. Those thus sensitized are sensitive to a wider wavelength region and also have a higher speed than conventional ones so as to allow the reduction of an exposure dose, thus making smaller the influence upon the human body. Thus, the dye sensitization is a very useful sensitizing means, but has lots of problems yet to be solved; for example, there still remain problems that no adequate sensitivity can be obtained depending on the type of the photographic emulsion used, and so forth.

Also, there are cases where various mechanical pressure applied prior to exposure causes a pressure sensitization trouble (desensitization marks found on a light-sensitive material at the time of its development, caused by mechanical pressure applied before exposure). For example, a medical X-ray film sheet, since its size is large, sometimes bends from its supported portion due to its own weight to cause a pressure desensitization trouble which tends to appear in the form of so-called knick marks.

Also, nowadays medical X-ray photographic systems such as automatic exposure and processing apparatus provided with mechanical transport systems are widely used. In these apparatus, mechanical force is applied to the film in transit, and tends to cause both the foregoing pressure-darkening and pressure desensitization troubles especially in the winter season or in a dry place. Such phenomena will probably constitute a serious hindrance to diagnoses. Particularly it is well-known that the larger the grain size of and the higher the speed of a silver halide photographic light-sensitive material the more easily does the pressure desensitization trouble occur.

There are those methods using. e.g., thalium or dyes for the purpose of improving so as not to cause the pressure desensitization as described in U.S. Pat. Nos. 2,628,167, 2,759,822, 3,455,235, 2,296,204, French patent No. 2,296,204, and Japanese Patent Publication Open to Public Inspection (hereinafter referred to as Japanese Patent O.P.I. Publication) Nos. 107129/1976 and 116025/1975, and the like, but some of them are not adequate in the degree of the improvement, some produce a conspicuous dye stain, and some others can not necessarily be considered to derive adequately the nature of a high-speed silver halide photographic light-sensitive material utilizing chiefly the ordinary surface high sensitivity of a large average grain size.

On the other hand, many attempts have hitherto been made to improve silver halide photographic light-sensitive materials so as not to cause the pressure desensitization by changing the physical property of the binder thereof. Such attempts are found in, e.g., U.S. Pat. Nos. 3,536,491, 3,775,128, 3,003,878, 2,759,821 and 3,772,032, Japanese Patent O.P.I. Publication Nos. 3325/1978, 56227/1975, 147324/1975 and the like. However, these techniques, although improving light-sensitive materials in respect of the pressure desensitization, deteriorates conspicuously the physical properties of the binder such as dryability, scratch resistance, etc., and thus cannot improve light-sensitive materials fundamentally.

SUMMARY OF THE INVENTION

It is an object of the present invention to provide a silver halide photographic light-sensitive material which, when subjected to a super-rapid processing whose total processing time is from 20 to 60 seconds, is solved in respect of the above problems of conventional techniques and excellent in the sensitivity, contrast, maximum density, fixability, dryability, and the like.

Another object of the present invention is to provide a silver halide photographic light-sensitive material which causes little or no trouble in the coating thereof even though it uses a small amount of gelatin.

Still other objects of the present invention will be apparent from what will be described hereinafter.

The above objects of the present invention are accomplished by a silver halide photographic light-sensitive material comprising a support having thereon at least one hydrophilic colloid layer comprising at least one silver halide emulsion layer, wherein the hydrophilic colloid layers are formed by one or more times of coating provided that wet thickness of the layer coated in each coating is within the range of from 35 to 80 μm, and a total gelatin content of the whole hydrophilic colloid layer is in an amount of from 2.20 to 3.10 g/m$^2$, and a method for processing in which the above-mentioned silver halide photographic light-sensitive material is processed by an automatic processor for the time within the range of from 20 to 60 seconds.

When an amount of gelatin used is exceeds 3.10 g/m$^2$, the applicability to super-rapid processes will be insufficient, because the developing time and drying time are prolonged: and when a gelatin amount is not more than 2.20 g/m$^2$, a uniform coated layer is liable to hardly be formed and the graininess of images will also be deteriorated.

When a gelatin amount exceeds 3.10 g/m$^2$, a wet layer thickness will cause a few coating trouble, and when it is not more than 3.1 g/m$^2$, such a wet layer thickness will seriously affect a layer coating.

DETAILED DESCRIPTION OF THE INVENTION

The wet layer thickness herein, where one or two or more liquids are coated superposedly simultaneously on a support, implies the total of the thicknesses (μm) of the support, implies the total of the thicknesses (μm) of the wet layers immediately after the coating of the 1 (in other words, immediately before the beginning of drying). (If one single layer alone is coated, it is the thickness of the layer in the wet condition immediately after the coating of this layer.) The wet layer thickness can be found by the following formula:

Wet layer thickness (μm) = [A total of supply amounts of coating liquids (liter/min.) × 1000]/[coating speed (m/min.) × coating width (m)]

Also, the wet layer thickness herein, where coatings are made serially, i.e., where after one layer is coated and dried another layer is superposed thereon, also implies the thickness of each coated liquid.

In this invention, the wet layer thickness is in the range of from 35 to 75 μm, and most preferably from 45 to 70 μm. If the wet layer is too thick, the load at the time of drying becomes so large as to increase the amount of heat for drying and to lower the coating speed, thus leading to the increase in the production cost, the deterioration of the productivity, and the like. If the wet layer thickness is too thin to the contrary, it is difficult to carry out a uniform coating with no trouble.

In the silver halide photographic light-sensitive material of this invention, the gelatin content of the hydrophilic colloid layer (including the silver halide emulsion layer) on the light-sensitive silver halide emulsion layer side on the support thereof is in the range of from 2.20 to 3.10 g/m$^2$.

If the amount of gelatin is smaller than the lower limit of the range, it increases coating troubles, while the amount of gelatin exceeds the upper limit, it deteriorates the dryability of the light-sensitive material. The amount of gelatin is more preferably from 2.40 to 2.90 g/m$^2$, and most preferably from 2.50 to 2.80 g/m$^2$.

A silver halide light-sensitive material prepared in the process of the invention contains, in at least one side thereof, a silver halide in an amount of nor more than 3.5 g/m$^2$ in terms of silver.

Such a light-sensitive material can be used in the invention, provided that the silver content is not greater than 3.5 g/m$^2$ on any one side of the material. For example, in the case where silver halide is contained on both sides of the material, the silver content on any one side may not be greater than 3.5 g/m$^2$.

The silver content on any one side thereof should be within the range of preferably from 1.5 to 3 g/m$^2$ and more preferably from 2.0 to 2.8 g/m$^2$.

The light-sensitive material of the invention has a photographic component layer which comprises two layers (the outermost layer and the layer adjacent to the outermost layer), which in turn are prepared by coating respective coating solutions on the respective layers. The viscosity of each coating solution will be described below.

Each one of the coating solutions is prepared so that its viscosity is not greater than 20 cp and more preferably not greater than 15 cp, respectively. Further, it is preferred that the difference between the viscosities of both coating solutions is 2 cp.

Any thickening agents may be used, provided that they do not particularly affect any silver halide photographic light-sensitive materials. The thickening agents can display a thickening effect. In other words, the agents are not limited to any particular substances, provided that they do not interfere with the characteristics of the above-mentioned light-sensitive materials.

Preferred thickening agents include, for example, an aqueous polymer having a sulfuric acid ester group such as those described in Japanese Patent Examined Publication No. Sho 36-21574 (1961), dextran and the sulfuric acid esters thereof such as those described in Japanese Patent Examined Publications Nos. Sho 35-11989 (1960) and Sho 45-12872 (1970), polysaccharides such as those described in U.S. Pat. No. 3,767,410, polymers having a sulfonic acid group, a carboxylic acid group or a phosphoric acid group such as those described in Japanese Patent Publication Open to Public Inspection No. Sho 53-18687 (1978), colloidal silicas such as those described in Japanese Patent Publication Open to Public Inspection No. Sho 58-36768 (1983), and so forth. The most preferred thickening agents include, for example, those described in Japanese Patent Publication Open to Public Inspection No. Sho 57-109947 (1982).

The thickening agents preferred in the present invention, other than colloidal silicas, may be used independently or in combination. The amount of thickening agent used therein may be suitably selected according to the kinds of silver halide and the kinds of layers or compounds to which the thickening agents are to be added. The viscosity of a coating solution is satisfactory if it can be adjusted by making use of a suitable thickening agent(s) so as not to be greater than 20 cp.

After the viscosity of the solutions is modified with thickening agents, the actual viscosity may be determined by measuring the solution at a certain temperature with the use of a viscometer such as those of B-type or the like.

Another preferred embodiment of this invention is such that, where the hydrophilic colloid layer on the silver halide emulsion side consists of two or more layers, the layers are coated under the condition that the surface tension of the liquid constituting the topmost layer thereof is 6 dyne/cm smaller than that of the coating liquid forming the hydrophilic colloid layer adjacent to the said topmost layer. The difference in the surface tension between the two layers is more preferably not less than 8 dyne/cm, and most preferably not less than 10 dyne/cm.

In order to obtain such the difference in the surface tension, at least one surface active agent should be used. The surface active agent may or may not be used in the adjacent layer to the topmost layer. If the agent should be used, it may be either the same as or different from that used in the topmost layer.

Materials usable as the surface active agent include nonionic surface active agents such as, e.g., saponins (steroid type), alkylene-oxide derivatives such as, e.g., polyethylene glycol, polyethylene glycol/polypropylene glycol condensate, polyethylene glycol-alkyl ethers or polyethylene glycol-alkylaryl ethers, polyethylene glycol esters, polyethylene glycol sorbitan esters, polyalkylene glycol alkylamines or amides, polyethylene oxide adducts of silicone; glycidol derivatives such as an alkenyl-succinic acid polyglycerides, alkyl-phenol polyglycerides; fatty acid esters of polyhydric alcohols, alkyl esters of sugar, and the like; anionic surface active agents containing an acid group such as a carboxyl, sulfo, phospho, sulfate or phosphate group, such as, e.g., alkyl-carboxylates, alkyl-sulfonates, alkylbenzenesulfonates, alkylnaphthalene-sulfonates, alkyl-sulfates, alkyl-phosphates, N-acyl-N-alkyl-taurines, sulfosuccinates, sulfoalkyl-polyoxyethylenealkylphenyl ethers, polyoxyethylenealkyl phosphates, and the like; amphoteric surface active agents such as amino acids, aminoalkylsulfonic acids, aminoalkyl-sulfates or phosphates, alkyl-betaines, amine oxides, and the like; cationic surface active agents such as alkylamine salts, aliphatic or aromatic quaternary ammonium salts, heterocyclic quaternary ammonium salts such as pyridinium, imidazolium, etc., aliphatic or heterocyclic ring-containing sulfoniums or sulfonium salts, and the like; fluorine-containing surface active agents, polyoxyethylene having fluorine-containing surface active agents, and the like.

The above-described alkylene-oxide-type surface active agents include those as described in Japanese Patent Examined Publication No. 9610/1976, West German Patent No. 2,648,746, Japanese patent O.P.I. Publication Nos. 129623/1978, 896524/1979, 98235/19790, 203435/1983, 208743/1983, 80848/1985 and 94126/1985, and the like. Examples of the combined use of the alkylene-oxide-type surface active agents and other compounds are found in Japanese Patent O.P.I. Publication Nos. 89626/1979, 70837/1980, 11341/1982, 109947/1982, 74554/1984, 1985, 76742/1985, 76743/1985, 80839/1985, 80846/1985, 80847/1985, 131293/1975 and 29715/1978, and the like. Examples of the anionic surface active agents include those described in Japanese Patent O.P.I. Publication No. 21922/1978, British Patent No. 1,503,218, and Japanese Patent Examined Publication No. 1617/1981, and higher alcohols, sulfates, higher alkylsulfonates, alkylbenzenesulfonates, dialkylsulfosuccinates, acylmethyltaurides, N-acylsarcosinates, fatty acid monoglyceride sulfates, α-sulfonic acids, and the like.

Examples of the above fluorine-containing surface active agent include those compounds disclosed in, e.g., Japanese Patent Examined Publication Nos. 9393/1972, 43130/1973, 25087/1977 and 1230/1982, Japanese Patent O.P.I. Publication Nos. 46733/1974, 16525/1975, 34233/1975, 32322/1976, 14224/1979, 111330/1979, 557762/1980, 19042/1981, 41093/1981, 34856/1981, 11341/1982, 29691/1982, 64228/1982, 146248/1982, 114944/1981, 114945/1981, 196544/1983, 200235/1983, 109548/1985 and 136534/1982, U.S. Pat. Nos. 3,589,906, 3,775,126 and 4,292,402, and Research Disclosure 16630, and the like, and those compounds exemplified in Japanese Patent O.P.I. Publication No. 164738/1985.

Preferred examples of the anionic surface active agents will be given in the following 1—1 through 1-10.

$C_4H_9—SO_3Na$ 1-1

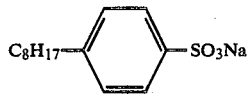
1-2

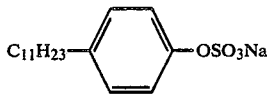
1-3

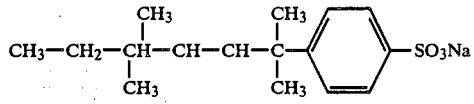
1-4

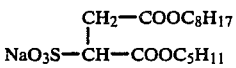
1-5

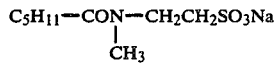
1-6

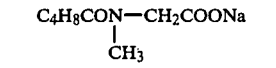
1-7

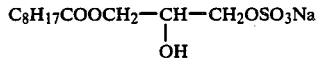
1-8

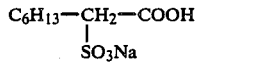
1-9

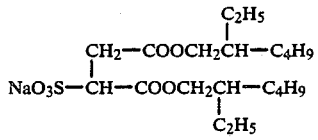
1-10

Preferred examples of the fluorine-containing surface active agents will be given in the following 2-1through 2-82.

$C_3F_5O(CH_2CH_2O)_{20}C_{12}H_{25}$ 2-1

$C_3F_5O(CH_2CH_2O)_5C_3F_5$ 2-2

$C_6F_{13}O(CH_2CH_2O)_{10}C_4H_9$ 2-3

$C_6F_{13}O(CH_2CH_2O)_{20}C_6H_{13}$ 2-4

$C_6F_{13}O(CH_2CH_2O)_7CH_3$ 2-5

$C_9F_{17}O(CH_2CH_2O)_{20}CH_3$ 2-6

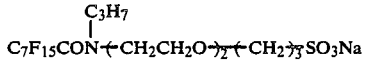
2-7

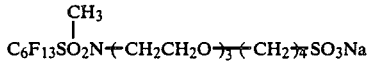
2-8

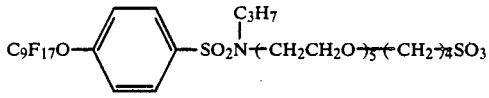
2-9

-continued
2-10
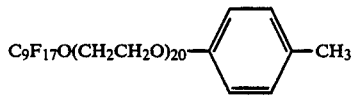
2-11
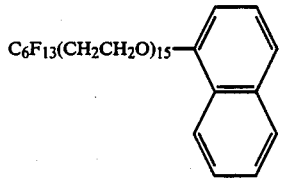
2-12
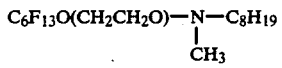
2-13
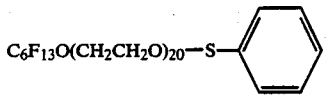
2-14
$C_6F_{13}O(CH_2CH_2O)_{40}-C_{18}H_{35}$
2-15
$C_9F_{17}O(CH_2CH_2O)_{10}-H$
2-16
$C_{12}F_{23}(CH_2CH_2O)_{50}-CH_3$
2-17
$C_6F_{11}O(CH_2CH_2O)_{20}(CH(CH_3)CH_2O)_3CH_3$
2-18
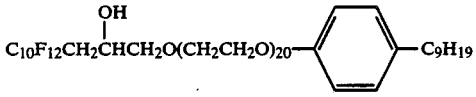
2-19
$C_9F_{19}CH_2(OH)CHCH_2O(C_2H_4O)_{10}CH_3$
2-20
$C_6F_{13}SO_2N(C_3H_7)(CH_2CH_2O)_2C(=O)-CH$
$C_6F_{13}SO_2N(C_3H_7)(CH_2CH_2O)_2C(=O)-CH_2-SO_3Na$
2-21
$C_8F_{17}(CH_2CH_2O)_5(CH_2)_4SO_3Na$
2-22
$H(CF_2)_8CH_2O(CH_2CH_2)_4(CH_2)_3SO_3H$
2-23
$C_2F_{15}COO(CH_2CH_2O)_4(CH_2)_4SO_3K$
2-24
$C_8F_{17}SO_2N(CH_3)(CH_2CH_2O)_8SO_3Na$
2-25
$C_4F_9(CH_2CH_2O)_3SO_3Na$
2-26
$C_8F_{17}SO_2N(C_3H_7)(CH_2CH_2O)_6CH_2COONa$
2-27
$H(CF_2)_8CH_2O(CH_2CH_2O)_3P(=O)(ONH_4)-ONH_4$
2-28
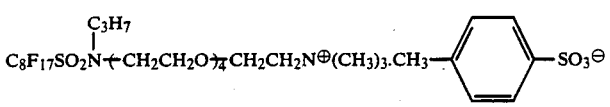

-continued
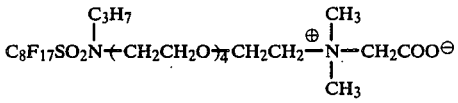
2-29
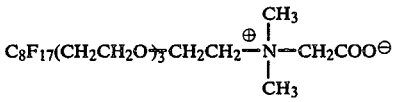
2-30
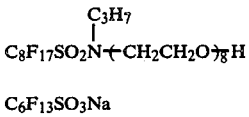
2-31
$C_6F_{13}SO_3Na$ 2-32
$C_8F_{17}SO_3Na$ 2-33
$C_6F_{13}COOK$ 2-34
$C_8F_{17}SO_3COOK$ 2-35
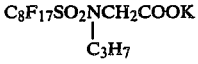
2-36
$F_3C-(CF_2)_2-COOH$ 2-37
$H-(CF_2)_6-COOH$ 2-38
$CF_3-(CF_2)_6-COONH_4$ 2-39
$H-(CF_2)_{10}-COOH$ 2-40
$H-(CF_2)_6-CH_2-OSO_3Na$ 2-41
$H-(CF_2)_3-CH_2-OSO_3Na$ 2-42
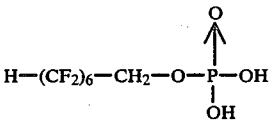
2-43
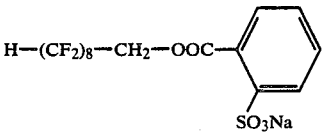
2-44
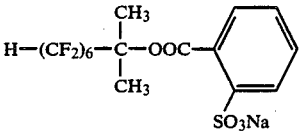
2-45
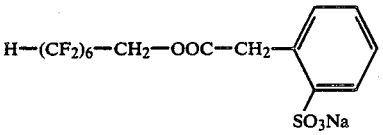
2-46
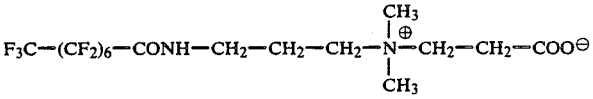
2-47
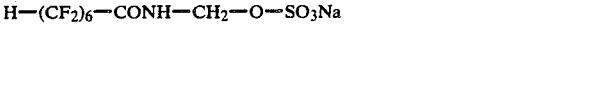
2-48

-continued
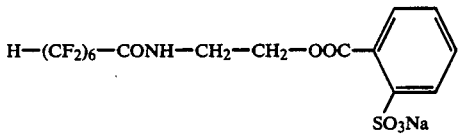
2-49
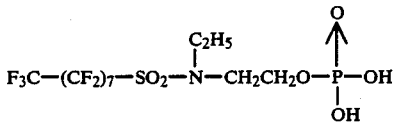
2-50
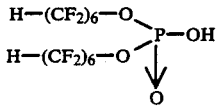
2-51
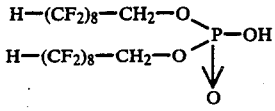
2-52
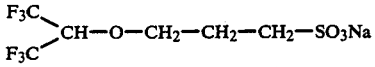
2-53
$H-(CF_2)_6-CH_2-O-CH_2-CH_2-CH_2-SO_3Na$ 2-54
$F_3C-(CF_2)_6-CH_2-O-CH_2-CH_2-CH_2-SO_3Na$ 2-55
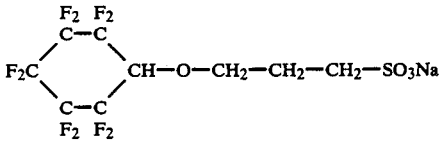
2-56
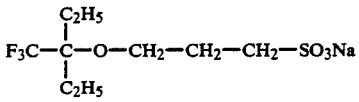
2-57
$F_3C-(CF_2)_2-COO-CH_2-CH_2-CH_2-SO_3Na$ 2-58
$H-(CF_2)_{10}-COO-CH_2-CH_2-CH_2-SO_3Na$ 2-59
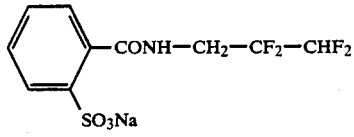
2-60
$F_3C-(CF_2)_2-COO(-CH_2CH_2O)_7-CH_3$ 2-61
2-62
$F_3C-(CF_2)_2-CH_2O(-CH_2CH_2O)_5H$ 2-63
2-64
2-65

-continued
2-66
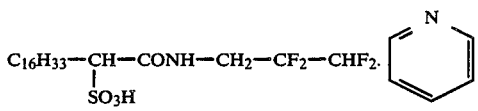
2-67
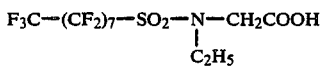
2-68
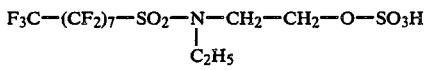
2-69
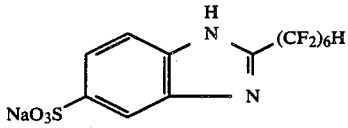
2-70
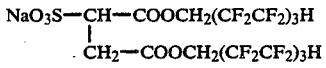
2-71
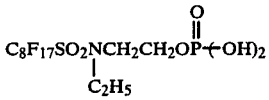
2-72
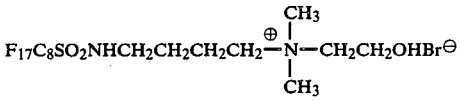
2-73
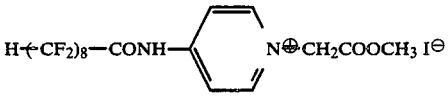
2-74
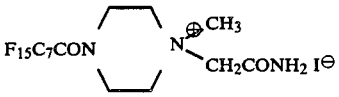
2-75
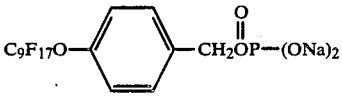
2-76
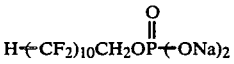
2-77
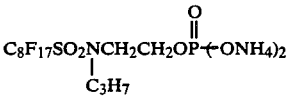
2-78
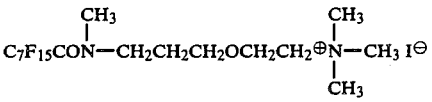
2-79
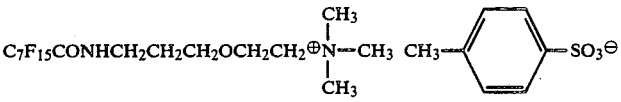
2-80
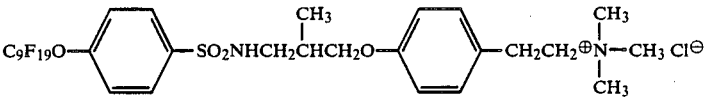

-continued

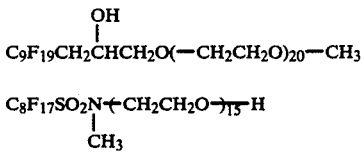

2-81

2-82

Commercially available fluorine-containing surface active agents include those available in the trade name of Unidyne from Daikin Industry Co., Ltd., those in the trade name of Fluorad from 3M (Sumitomo 3M).

As described above, the preferable embodiments in which the hydrophilic colloidal layers of the invention each comprise two or more layers include, for example, an embodiment in which the topmost layer comprises a hydrophilic colloidal layer and the layer adjacent to the topmost layer comprises a silver halide emulsion layer.

In this case, the wet-coated layer thickness ratio of the above-mentioned emulsion layer to a hydrophilic colloidal layer at the time of coating is, preferably, from 6:4 to 9:1 and, more preferably, from 7:3 to 9:1. If the wet-coated layer thickness ratio of the emulsion layer is less than 6 and the wet-coated layer thickness ratio of the hydrophilic colloidal layer is increased accordingly, it is liable to cause such a trouble as streaks, blotches and so forth at the time of coating. If the wet-coated layer thickness ratio of the emulsion layer exceeds 9, it is liable to cause scratches and blackening.

Subsequently, the silver halide grains to be used in the light-sensitive silver halide emulsion layer of the light-sensitive material of this invention will be described below:

One preferred embodiment of this invention is such that the average grain size of the silver halide grains used in the silver halide emulsion layer is from 0.30 to 1.20 μm, more preferably from 0.40 to 1.00 μm, and most preferably from 0.40 to 0.80 μm.

In this specification, the silver halide grain size implies the length of an edge of a cube equivalent in the volume to the grain, and the average grain size is the arithmetical average of the grain sizes.

The grain size distribution of the grains used may be either wider or narrower.

The grain size distribution of the silver halide grains in the emulsion layer is discretional, but the grains may also be monodisperse. The term "monodisperse" used herein means a disperse system that 95% of grains are within the size range of the average grain size ±60%, and preferably within the range of ±40%, wherein the average grain size is the average of the diameters of the projected areas of silver halide grains.

The silver halide grains in the emulsion layer may be each in the form of a regular crystal such as a cubic, octahedral, tetradecahedral or dodecahedral crystal, or in the form of an irregular crystal such as a spherical or tabular crystal, or in the complex form of these crystals. Also, the silver halide grains may also be a mixture of various crystal-line forms-having grains. The grain may also be a composite-type silver halide crystal formed by combining an oxidized product crystal such as of PbO with a silver halide crystal such as of silver chloride, epitaxially grown silver halide crystal (such as one formed by epitaxially growing silver iodobromide, silver iodide, etc. on silver bromide), or a crystal wherein a regular hexahedral silver chloride crystal is orientedly superposed on a hexagonal-system or regular octahedral silver iodide crystal.

Also, the emulsion layer may be of an emulsion containing super-tabular silver halide grains each of which has a diameter that is not less than five times the thickness thereof and the total projected area of the super-tabular grains accounts for not less than 50% of the grand total projected area of the whole grains contained in the emulsion. This matter is described in detail in Japanese Patent O.P.I. Publication Nos. 127921/1983 and 113927/1983.

The silver halide grains contained in the light-sensitive silver halide emulsion in this invention is desirable to comprise regular-structure or regular-form grains accounting for at least 80% by weight or by number.

The regular-structure or regular-form grain herein implies a grain containing no anisotropic growth such as the twinning plane but growing isotropically; e.g., in the cubic, tetradecahedral, regular octahedral, dodecahedral or spherical form. Methods for the preparation of such regular silver halide grains are described in, e.g., the Journal of Photographic Science (J. Phot. Sci.), 5,332 (1961); Ber. Bunsenges. Phys. Chem., 67, 949 (1963), and International Congress of Photographic Science Of Tokyo (1967), and the like. Such regular silver halide grains may be obtained by controlling the reaction condition under which silver halide grains are grown by use of the simultaneous mixing process. In the simultaneous mixing process, the silver halide grains are prepared by pouring equivalent amounts of both a silver nitrate solution and a halide solution into an aqueous protective colloid solution with vigorously stirring.

In the practice of this invention, where, for example, the above regular silver halide grains should be incorporated, irregular silver halide grains may also be incorporated. However, where such irregular grains should be present, they should be not more than about 50% by weight or by number. In the preferred embodiment, regular silver halide grains account for at least 60 to 70% by weight.

In preparing an emulsion having monodisperse and/or regular silver halide grains, it is desirable that the supply of silver and halide ions be made so as to have the growth rate of the grains increase gradually continuously or by stages in the critical growth rate or in the allowable range to supply silver halide necessary and sufficient for the growth of the existing grains alone without dissolving the existing crystalline grains as they grow and without allowing the production and growth of new grains. Examples of the gradual growth of silver halide grains are described in Japanese Patent Examined Publication Nos. 36890/1973, 16364/1977, and Japanese Patent O.P.I. Publication No. 142329/1980.

In other words, it is effective to supply the silver and halide ions so that the growth rate of silver halide grains is 30 to 100% of the critical growth rate.

The critical growth rate varies according to temperature, pH. pAg, the degree of stirring, the composition of silver halide grains, solubility, grain sizes, inter-grain intervals, crystal habits, or the type and concentration of protective colloid, and it is easily experimentally found by the microscopic observation or the measurement of the turbidity of a liquid phase suspending emulsion grains.

In practicing this invention, the silver halide grains to be used in the light-sensitive silver halide emulsion layer may be prepared by the application of those neutral process, acidic process, ammoniacal process, orderly mixing process, inversely mixing process, double-jet process, controlled double-jet process, conversion process, core/shell process or the like, as described in, e.g., T. H. James, "the Theory of the Photographic Process,"]4th ed., (Macmillan, 1977); P. Glfkides, "Chimie et Physique Photographique," (Paul Montel, 967); G. F. Duffin, "Photographic Emulsion Chemistry." (The Focal Press, 1966); V. L. Zelikman et al, "Making and Coating Photographic Emulsion" (The Focal Press, 1964), and the like.

As a different type of the double-jet process, the triple-jet process may also be used in which soluble halides different in the composition (e.g., a soluble silver salt, soluble bromide, and soluble iodide) are separately added.

A method for growing grains in the presence of an excessive amount of silver ions (the so-called inversely mixing process) may also be used.

As one type of the simultaneously mixing process, a method for keeping constant the pAg of the liquid phase where silver halide is formed; i.e., the so-called controlled double-jet process, may also be used.

According to this process, a silver halide emulsion having regular-crystalline-form grains of nearly uniform sizes can be obtained.

In the formation of silver halide grains, in order to control the growth of the grains, a silver halide solvent may be used, examples of which include ammonia, potassium thiocyanide, ammonium thiocyanide, thioether compounds (such as those described in U.S. Pat. Nos. 3,271,157, 3,574,628, 3,704,130, 4,297,439, 4,276,374), thione compounds (such as those described in Japanese Patent O.P.I. Publication Nos. 44319/1978, 82408/1978, 77737/1980), amine compounds (such as those described in Japanese Patent O.P.I. Publication No. 100717/1979), and the like. Among these, ammonia is preferred.

Separately formed two or more different silver halide emulsions may be used in a mixture.

It is desirable that these silver halide grains or emulsion contain at least one salt from the group consisting of those salts (soluble salts) of iridium, thalium, palladium, rhodium, zinc, nickel, cobalt, uranium, thorium, strontium, tungsten and platinum. The salt content of the emulsion is preferably from $10^6$ to $10^1$ moles per mole of pAg. and particularly preferably at least one salt out of the thalium, palladium and iridium salts should be contained in the emulsion. These salts may be used alone or in a mixture, and their adding position (time) is discretional. By doing this, improvement on the flash exposure characteristic, prevention of the pressure desensitization, prevention of the fading of latent images, sensitization, and other effects can be expected.

In practicing this invention, that the pAg in the mother liquid containing a protective colloid is at least 10.5 in the midst of the growth of silver halide grains prior to chemical sensitization can be adopted as a preferred embodiment. Particularly preferably the silver halide grains should pass through even once an atmosphere having a pAg of not less than 11.5. By rounding each of the grains with the (111) face thereof increased in thus manner, the effect of this invention can be raised farther. Such the (III) face of the grain is desirable to account for not less than 5% of the entire area thereof.

In this instance, the increasing rate of the (III) face (the rate of the increased face to the same face before passing through the pAg atmosphere of not less than I0.$) is preferably not less than 10%, and more preferably from 10 to Description of the judgement as to which of the (111) face and the (100) face covers the external surface of the silver halide grain or of the method of measuring the proportion of the faces can be found in the report by Akira Hirata in the "Bulletin of the Society of Scientific Photography of Japan" No. 13, pp. 5–15 (1963).

Whether the (111) face has increased by 5% or above or not can be easily ascertained by the Hirata's measurement after passing the grain once through the atmosphere of the protective colloid-containing mother liquid having a pAg of at least 10.5.

In this instance, the point of time when the above pAg is to be settled is desirable to be after completion of the addition of $\frac{2}{3}$ of the whole amount of silver to be added and before the desalting process usually taking place prior to chemical sensitization. It is because this manner facilitates the obtaining of a monodisperse emulsion having a narrow grain size distribution.

In addition, the ripening in the atmosphere of a pAg of not less than 10.5 is desirable to take place for more than two minutes.

Under such the pAg control, the (111) face increases by not less than 5% to thereby make the grain form round, whereby the grain whose (111) face accounts for not less than 5% of the entire surface area thereof can be obtained.

Still another preferred embodiment of this invention is a light-sensitive silver halide emulsion layer comprised substantially of silver iodobromide and comprising silver halide grains of a multistrata structure, the said grains each being comprised of strata of which arbitrary two adjacent strata having their own uniform iodide distributions, wherein the difference in the iodide content between the two strata (between the coats or between the internal core and the coat) is not less than 10 mole % and the average silver iodide content of the outmost stratum is not more than 10 mole %, the said silver halide grains being chemically sensitized.

The multistrata structure-having grain herein is one comprising an internal core having thereon arbitrary silver halide compositions-having coat which may be either a single stratum or two more strata such as, for example, those superposed in the form of three, four . . . strata, and preferably not more than five strata.

Silver halide for use in the formation of the internal core and coat may be silver bromide, silver iodobromide or silver iodide, but may be a mixture of a small amount of silver chloride therewith.

To be concrete, the amount of silver chloride is not more than about 10 mole %, and more preferably not more than about 5 mole %.

And the outmost stratum is substantially silver bromide or silver iodobromide (iodide content is not more than 10 mole %), and may also contain less than several mole % chlorine atoms.

In the light-sensitive material of this invention, the average silver iodide content of the whole silver halide grains is preferably not more than 10 mole %, and more preferably not more than 6 mole %.

For example, in the light-sensitive material for use in radiography or the like, since silver iodide may aggravate the problem of development restraining or of infectious development in practice the silver iodide content is desirable to be held down to a given limit.

The silver iodide content should be not more than 10 mole % of the whole grains, preferably not more than 7 mole %, and most preferably not more than 3 mole %.

Where the internal core is comprised of silver iodobromide, it is desirable to be a homogeneous solid solution phase, wherein the "homogeneous" will be described in detail below:

That is, it implies that, where powdery silver halide grains are subjected to an X-ray diffraction analysis, the half-value width of the peak of the face index of [200] of silver iodobromide obtained by using Cu-K$\beta$, X rays is not more than $\Delta 2=0.30$(deg). In addition, the using condition of the diffractometer used herein, where the scanning speed of the goniometer is regarded as $\omega$ (deg/min.), time constant as $\gamma$(sec.), and receiving slit width as $\gamma$(mm), is expressed as $\omega\gamma$ being equal to or less than 10.

In the silver halide composition of the internal core, the average iodine content thereof is preferably not more than 40 mole %, and more preferably from zero up to 20 mole %.

The difference in the silver iodide content between adjacent two strata (between arbitrary two strata of the coat or between the coat and the internal core) is preferably not less than 10 mole %, more preferably not less than 20 mole %, and most preferably not less than 25 mole %.

The silver iodide content of the coat other than the outmost coat is preferably from 10 mole % to 100 mole %.

Where the silver halide grain is comprised of not less than three strata of which the coat strata are of silver iodobromide, they need not always be all homogeneous, but it is more desirable that all the strata be homogeneous silver iodobromide.

Such the high silver iodide content-having coat (or internal core), in the case of a negative-type silver halide emulsion layer, is desirable to be present below the outmost surface coat, while on the other hand, in the case of a positive-type silver halide emulsion, it may be present either in the internal or in the external.

The silver iodide content of the outmost coat is preferably not more than 10 mole %, and more preferably from zero up to 5 mole %.

The silver iodide content of the internal core and the coat of the silver halide grains used in the light-sensitive silver halide emulsion layer of this invention may be found by any of those methods as described in, e.g., J. I. Goldstein and D. B. Williams, "X-Ray Analysis in TEM/ATEM," Scanning Electron Microscopy (1977), Vol. I, (IIT Research Institute), p. 651 (Mar. 1977).

Where the silver halide grain of the silver halide emulsion layer of this invention is comprised of, e.g., two strata, it is desirable that the internal core be of a higher iodide content than the outmost stratum, while in the case of three strata, it is desirable that the stratum underneath the outmost coat or the internal core be of a higher iodide content than the outmost coat.

In order to remove the soluble salts from the emulsion after the formation of the precipitate or after the physical ripening, the noodle washing method which is carried out by gelling gelatin may be used or the flocculation method utilizing inorganic salts, anionic surfactants, anionic polymers (such as polystyrenesulfonic acid) or gelatin derivatives (such as acylated gelatin, carbamoylated gelatin) may also be used. The process of removing the soluble salts is allowed to be omitted.

The present invention are applicable suitably to chemically sensitized silver halide grains; for, if the grains are unsensitized ones, the sensitivity thereof in itself is so low that both scratch trouble and pressure desensitization must hardly occur.

The silver halide grains of the light-sensitive silver halide emulsion layer of this invention may be of either the positive type or negative type.

Where it is of the negative type, the chemical sensitization thereof is desirable to be made so that the sensitivit, when taken at the point of [fog+0.1] in optical density, is not less than 60% of the optimum sensitivity.

Where it is of the positive type, the chemical sensitization thereof is desirable to be made to the inside of the grain so that the sensitivity, when taken at the point of [maximum density −0.1] in optical density, is not less than 60% of the maximum sensitivity.

For the chemical sensitization any of those methods as described in, e.g., 'Die Grundlagen der Photographischen Prozesse mit Silberhalogeniden,' edited by H. Frieser. (Akademische Veragaesellschaft, 1968), pp. 675–734, may be used.

That is, the sulfur sensitization method which uses active gelatins; sulfur-containing compounds capable of reacting with silver, such as thiosulfates, thioureas, mercapto compounds, rhodanines; the reduction sensitization method which uses reductive materials such as stannous salts, amines, hydrazine derivatives, formamidinesulfinic acid and silane compounds; the noble-metal sensitization method which uses noble-metallic compounds such as gold complex salts, complex salts of the metals belonging to Group VIII of the periodic table of elements, such as Pt, Ir, Pd, etc.; and the like, may be used alone or in combination.

Concrete examples of these methods are described in U.S. Pat. Nos. 1,574,944, 3,410,689, 2,278,947, 2,728,668, and 3,656,955 for the sulfur sensitization; U.S. Pat. Nos. 2,983,609, 2,419,974 and 4,054,458 for the reduction sensitization; and U.S. Pat. Nos. 2,599,083 and 2,448,060, and British Patent No. 618,061 for the noble-metal sensitization.

Still another preferred embodiment of this invention is the light-sensitive silver halide emulsion layer of this invention containing at least one sensitizing dye selected from the group consisting of those compounds having the following Formulas [I], [II]and [III].

If an embodiment using any of those compounds of Formulas [I], [II] and [III] is adopted, the light-sensitive emulsion is orthochromatically sensitized, so that the emulsion is improved farther in respect of the pressure desensitization and scratch-darkening troubles. Namely, regular-type emulsions, since they use highly sensitive large-size grains for forming the toe portion of characteristic curves, have been poor in the characteristic against the pressure desensitization and scratch-darkening troubles, while the orthochromatic type as in this embodiment, since highly sensitized by the dye sensitization, allows to make the grain size of the silver halide used smaller. As a result, the light-sensitive silver halide emulsion can be improved further on the characteristic thereof against the pressure desensitization and scratch-darkening troubles.

Formulas [I], [II] and [III] are as follows:

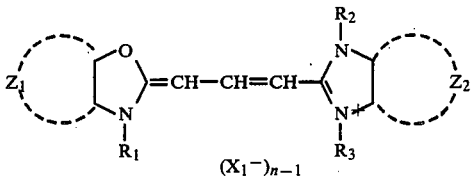

Formula [I]

wherein $R_1$, $R_2$ and $R_3$ each is a substituted or unsubstituted alkyl, alkenyl or aryl group, provided that at least one of the $R_1$ and $R_3$ is a sulfoalkyl or carboxyalkyl group; $X_1^-$ is an anion; $Z_1$ and $Z_2$ each is a group of nonmetallic atoms necessary to complete a substituted or unsubstituted carbocyclic ring; and n is 1 or 2, provided that n is 1 when an intramolecular salt is formed.

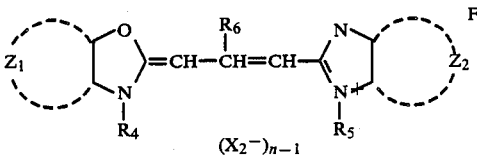

Formula [II]

wherein $R_4$ and $R_5$ each is a substituted or unsubstituted alkyl, alkenyl or aryl group, provided that at least any one of the $R_4$ and $R_5$ is a sulfoalkyl or carboxyalkyl group; $R_6$ is a hydrogen atom or a lower alkyl or aryl group; $X_2^-$ is an anion; $Z_1$ and $Z_2$ each is a group of nonmetallic atoms necessary to complete a substituted or unsubstituted carbocyclic ring; and n is 1 or 2, provided hat n is 1 when an intramolecular salt is formed.

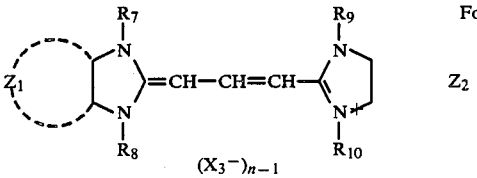

Formula [III]

wherein $R_7$ and $R_9$ each is a substituted or unsubstituted lower alkyl group; $R_8$ and $R_{10}$ each is a lower alkyl, hydroxyalkyl, sulfoalkyl or carboxyalkyl group; $X_3^-$ is an anion; $Z_1$ and $Z_2$ each is a group of nonmetallic atoms necessary to complete a substituted or unsubstituted carbocyclic ring; and n is 1 or 2, provided that n is 1 when an intramolecular salt is formed.

In these formulas, the carbocyclic ring completed by $Z_1$ or $Z_2$ is desirable to be aromatic ring such as a substituted or unsubstituted benzene ring or naphthalene ring.

The alkyl group represented by the $R_1$, $R_2$ or $R_3$ may be a branched one, and more preferably is an alkyl group having not more than 10 carbon atoms, and may have a substituent. Examples of the substituent include sulfo, aryl, carboxyl, amine (primary, secondary and tertiary) residues, alkoxy, aryloxy, hydroxy, alkoxycarbonyl, acyloxy, acyl, aminocarbonyl, cyano and the like groups, and halogen atoms. Examples of the alkyl group include methyl, ethyl, sulfoethyl, sulfopropyl, sulfobutyl, benzyl, phenethyl, carboxyethyl, carboxymethyl, dimethylaminopropyl, methoxyethyl, phenoxypropyl, methylsulfonylethyl, p-tert-butylphenoxyethyl, cyclohexyl, octyl, decyl, carbamoylethyl, sulfophenethyl, sulfobenzyl, 2-hydroxy-3-sulfopropyl, ethoxycarbonylethyl, 2,3 -disulfopropoxypropyl, sulfopropoxyethoxyethyl, trifluoroethyl, carboxybenzyl, cyanopropyl, p-carboxyphenethyl, ethoxycarbonylmethyl, pivaloylpropyl, propionylethyl, anisyl, acetoxyethyl, benzoyloxypropyl, chloroethyl, morpholinoethyl, acetylaminoethyl, N-ethylaminocarbonylpropyl, cyanoethyl, and the like groups.

The alkenyl group represented by the $R_1$, $R_2$, $R_3$ or $R_4$ is preferably an alkenyl group having not more than 10 carbon atoms, such as an allyl, 2-butenyl, 2-propinyl or the like group.

The aryl group represented by the $R_1$, $R_2$, $R_3$ or $R_4$ is, for example, a phenyl carboxyphenyl, sulfophenyl or the like group.

The anion represented by the $X_1^-$ of Formula [I] is, for example, chlorine ion, bromine ion, iodine ion, thiocyanic acid ion, sulfuric acid ion, perchloric acid ion, p-toluenesulfonic acid ion, ethylsulfuric acid ion, or the like.

The following are examples representative of the compound having Formula [I]:

(Exemplified compounds)

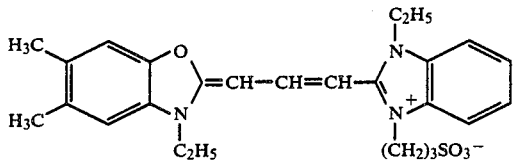

(1)

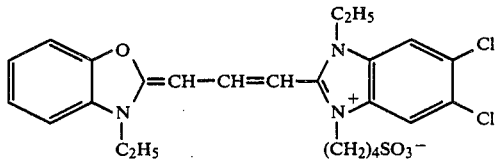

(2)

-continued
(Exemplified compounds)
(3)
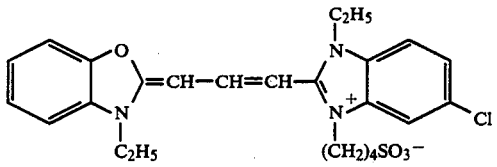
(4)
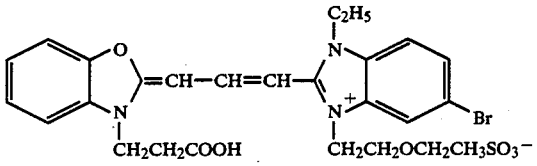
(5)
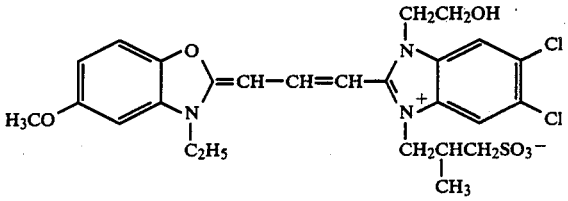
(6)
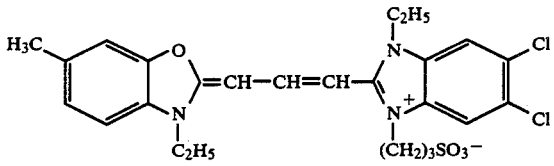
(7)
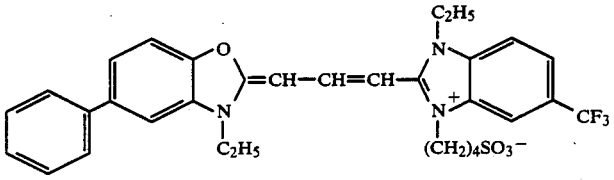
(8)
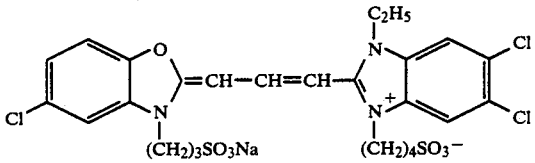
(9)
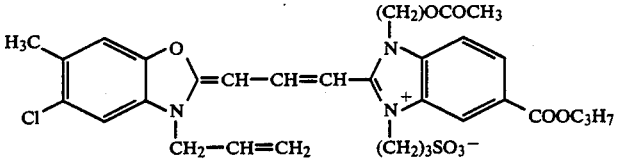
(10)
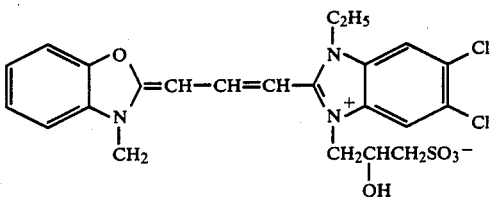

-continued
(Exemplified compounds)
(11)
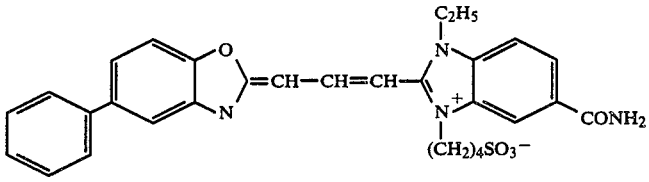
(12)
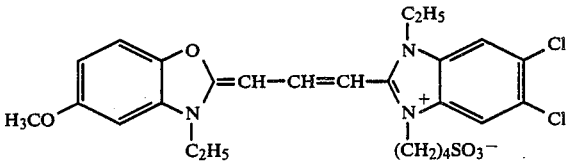
(13)
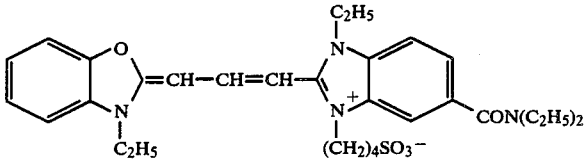
(14)
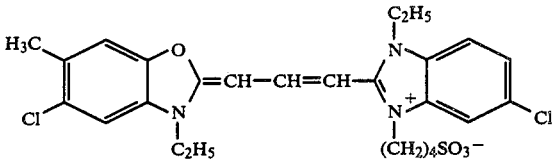
(15)
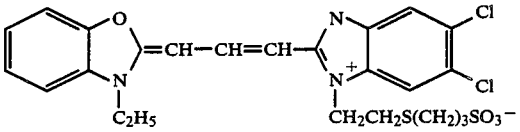
(16)
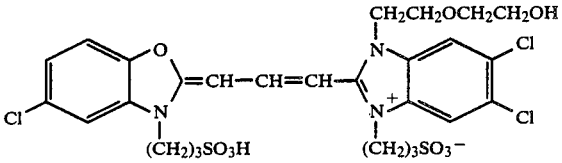
(17)
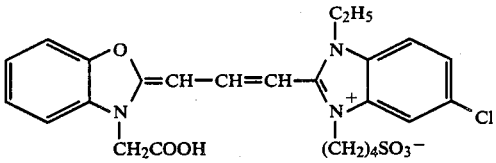
(18)
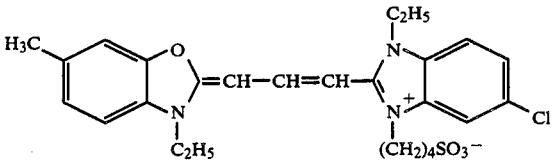
(19)
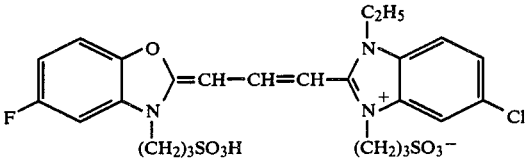

-continued
(Exemplified compounds)
(20)
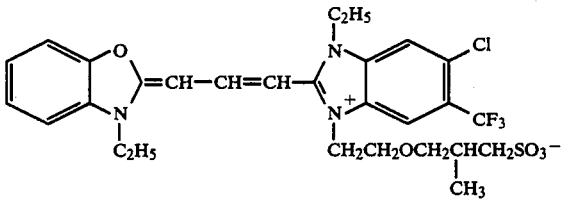
(21)
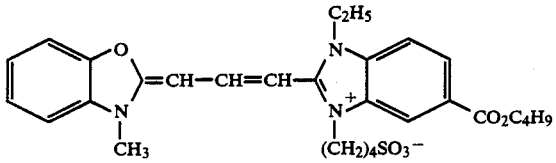
(22)
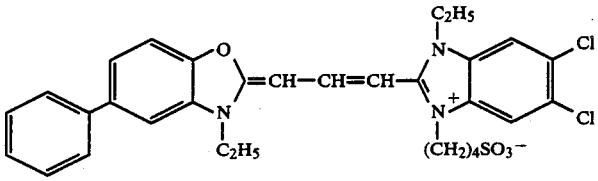
(23)
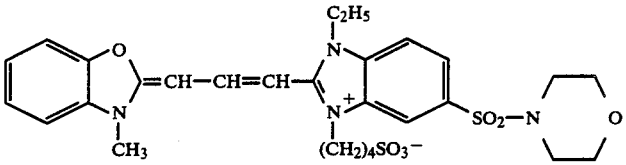
(24)
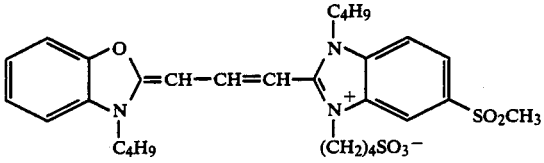
(25)
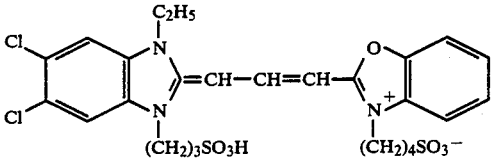
(26)
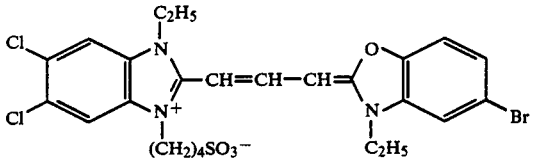
(27)
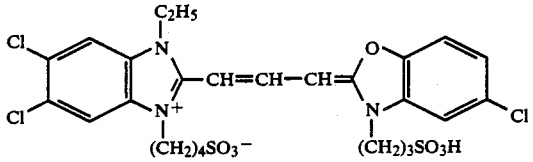
(28)
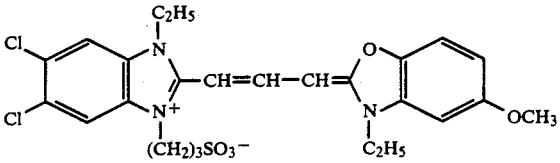

-continued
(Exemplified compounds)
(29)
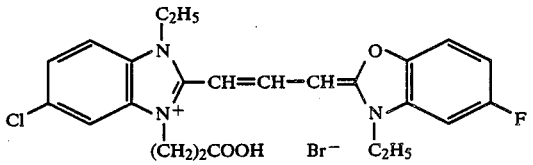
(30)
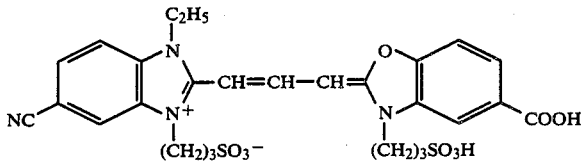
(31)
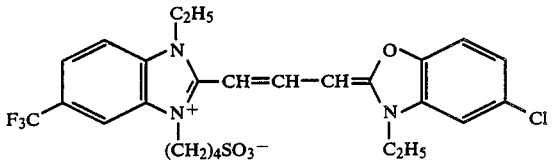
(32)
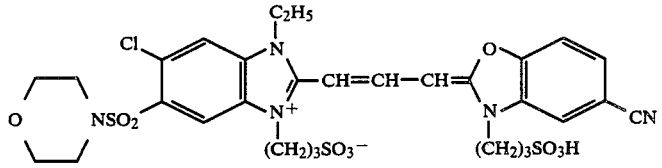
(33)
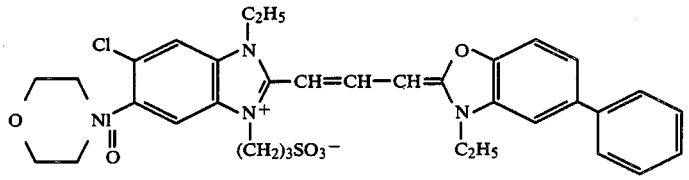
(34)
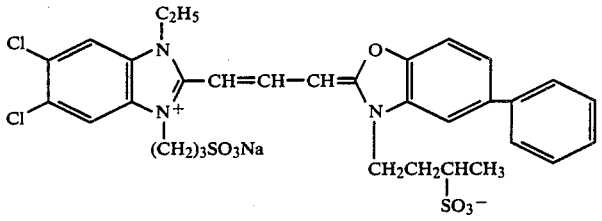
(35)
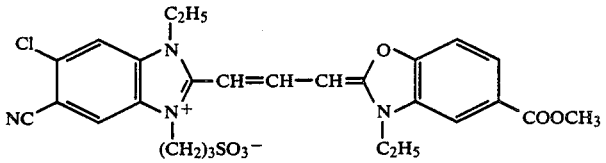
(36)
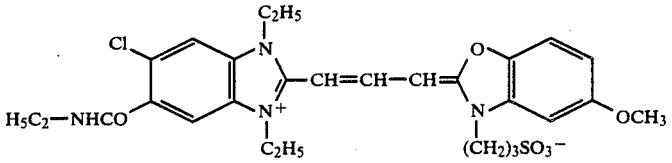

-continued (Exemplified compounds)

(37)

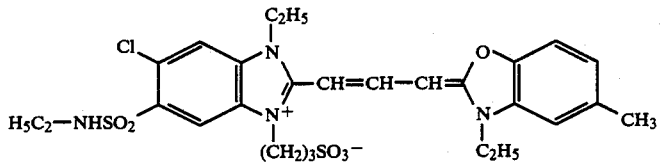

(38)

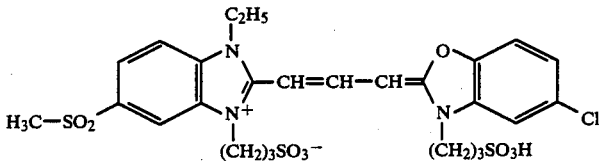

(39)

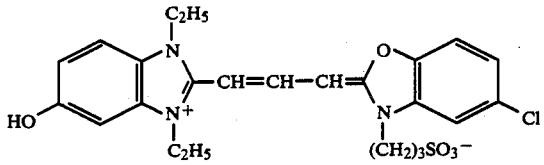

(40)

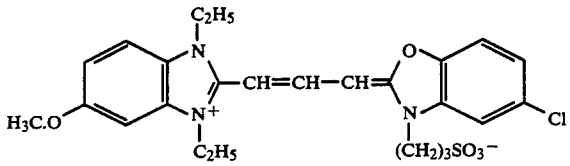

(41)

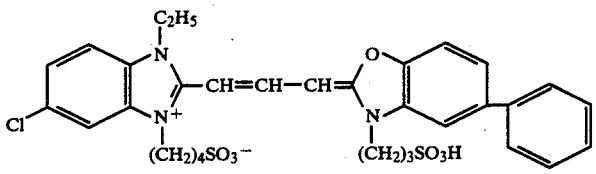

In Formula [II], the $R_6$ is a hydrogen atom, a lower alkyl group or an aryl group. The lower alkyl groups inclide, for example, a methyl, ethyl, propyl, butyl or the like group. The aryl groups include, for example, a phenyl group. The $R_4$ and $R_5$ represent those each denoted by the $R_2$ and $R_3$, respectively, in the foregoing Formula [I].

The anion represented by the $X_2^-$ also represents those each denoted by the $X_1^-$ of Formula [I].

The following compounds are the typical examples of the compounds each having Formula [II]:

(Exemplified compounds)

(42)

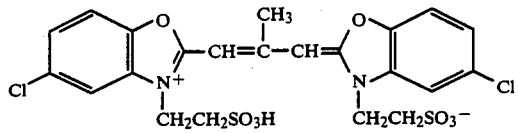

(43)

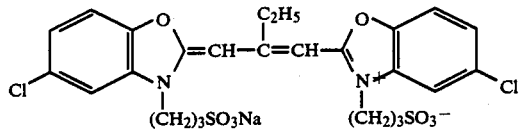

(44)

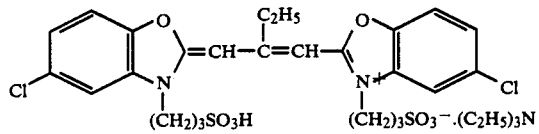

-continued
(Exemplified compounds)
(45)
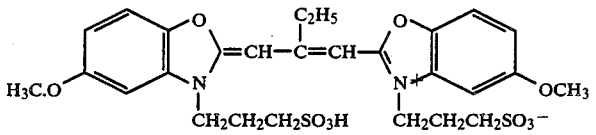
(46)
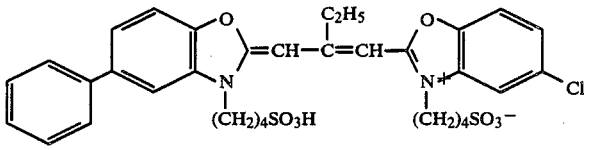
(47)
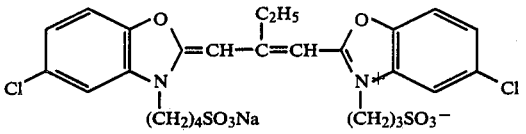
(48)
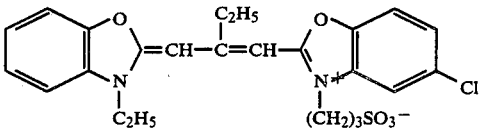
(49)
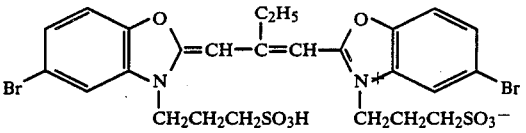
(50)
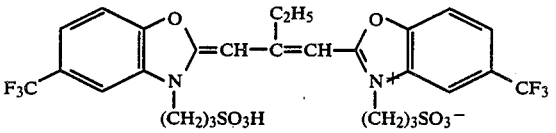
(51)
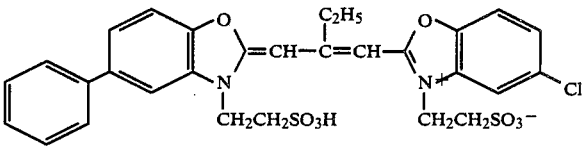
(52)
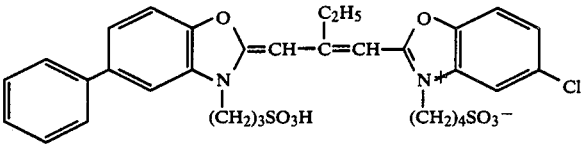
(53)
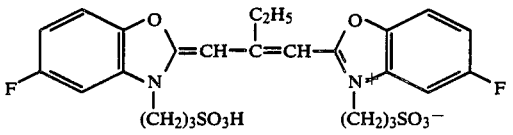
(54)
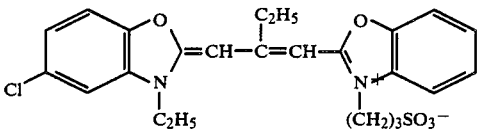

-continued
(Exemplified compounds)
(55)
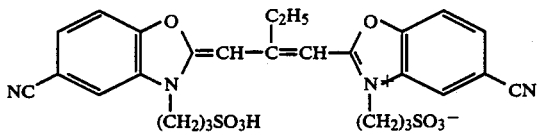
(56)
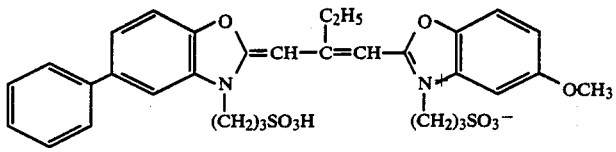
(57)
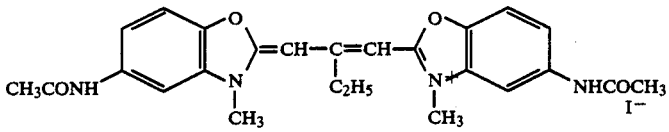
(58)
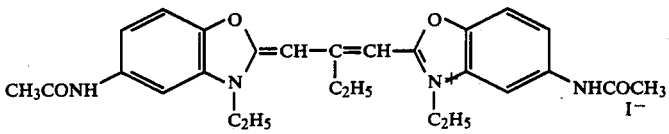
(59)
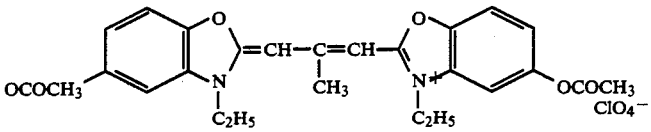
(60)
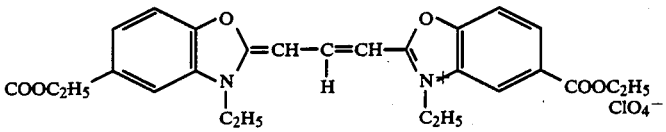
(61)
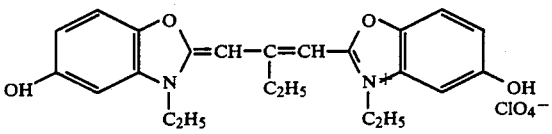
(62)
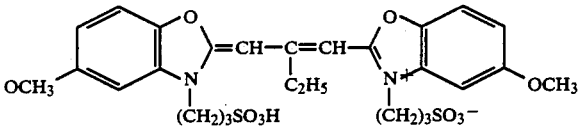
(63)
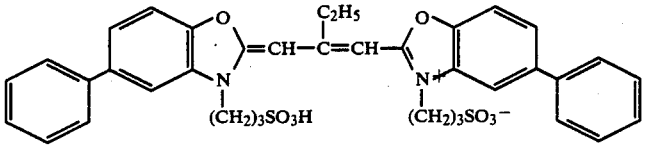
(64)
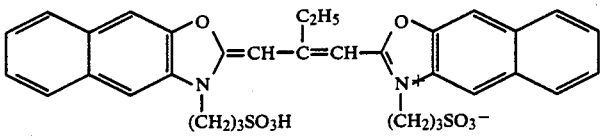

-continued (Exemplified compounds)

(65)

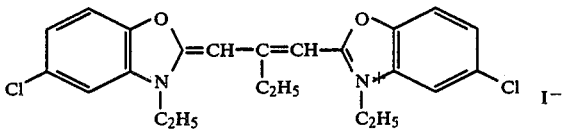

Subsequently, in Formula [III], the lower alkyl group represented by the $R_7$ or $R_9$ include, for example, a methyl, ethyl, propyl, butyl or the like group. The substituted lower alkyl group represents ones, whose alkyl portion has from 1 to 4 carbon atoms, out of those denoted by the $R_1$ through $R_3$ of Formula [I]. The lower alkyl group denoted by the $R_8$ or $R_{10}$ represents the same ones each denoted by the $R_7$ or $R_9$. The hydroxyalkyl group, sulfoalkyl group, and carboxyalkyl group denoted by the $R_8$ or $R_{10}$ represent those each denoted by the $R_1$ through $R_3$ of Formula [I].

The anions denoted by the also represent those each denoted by the $X_1^-$.

The following compounds are the typical examples of the compounds each having Formula [III]:

(Exemplified compounds)

(66)

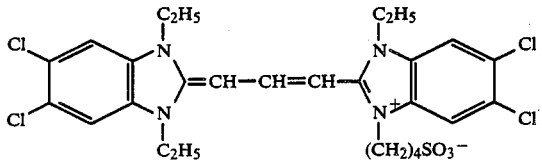

(67)

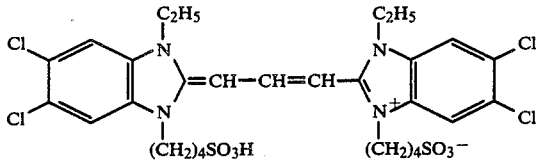

(68)

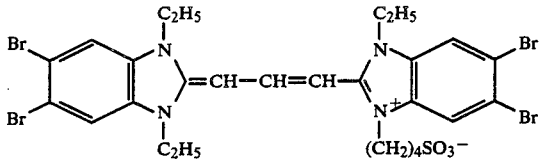

(69)

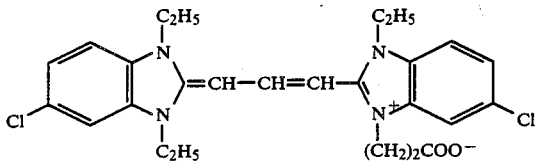

(70)

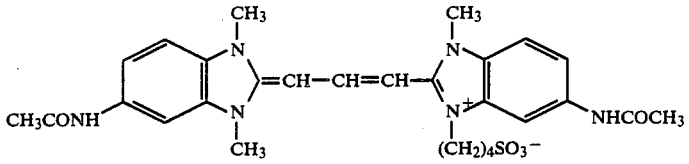

(71)

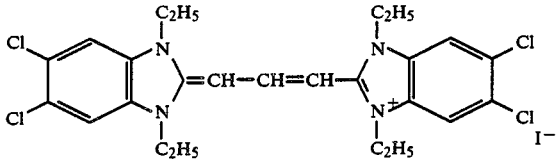

(72)

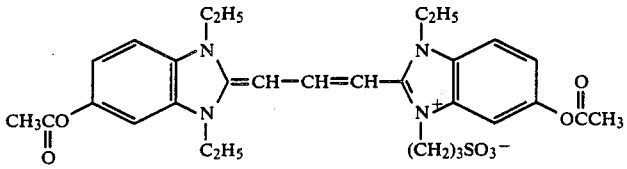

-continued (Exemplified compounds)

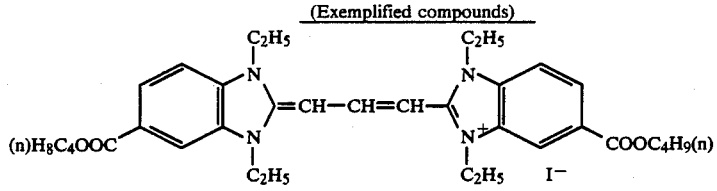
(73)

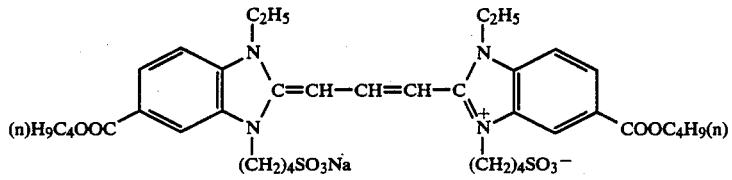
(74)

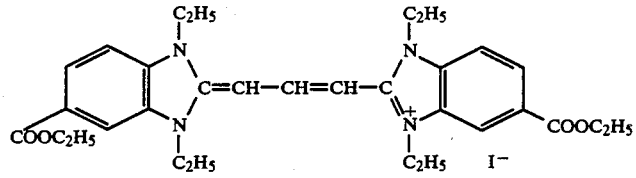
(75)

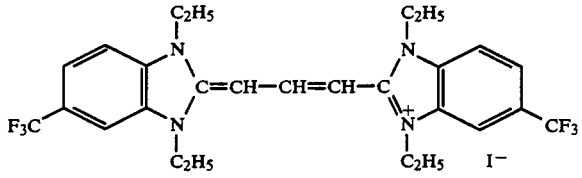
(76)

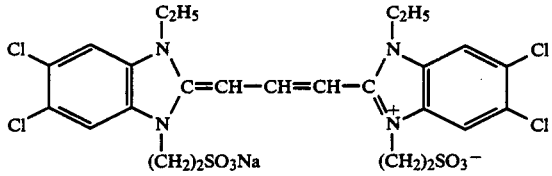
(77)

In the present invention, a total amount of these compounds having Formulas [I], [II] and [III] is to be within the range of from b 10 mg to 900 mg per mole of silver halide, and particularly preferably from 60 mg to 600 mg.

Any of these compounds of Formulas [I], [II] and [III] may be added to any discretional positions in the course of preparing the light-sensitive material, such as at a point of time before, in the midst of, or after completion of the chemical ripening, or before coating the emulsion.

The photographic emulsion to be used in the light-sensitive silver halide emulsion layer of the light-sensitive material of this invention may contain various compounds for the purpose of preventing the light-sensitive material from being fogged or of stabilizing the photographic characteristics of the light-sensitive material during the preparing process, the storage or the processing thereof, examples of which compounds to be incorporated include azoles such as benzothiazolium salts, nitroimidazoles, nitrobenzimidazoles, chlorobenzimidazoles, bromobenzimidazoles, mercaptothiazoles, mercaptobenzimidazoles, aminotriazoles, benzotriazoles, nitrobenzotriazoles, mercaptotetrazoles and, preferably, 1-phenyl-5-mercaptotetrazole and the like; mercaptopyrimidines; mercaptotriazines; thioketo compounds such as oxazolinethione; azaindenes such as triazaindenes, tetrazaindenes and, preferably, 4-hydroxy-substituted(1,3,3a,7)-tetrazaindenes, pentazaidenes and the like; benzenethiosulfonic acid, benzenesulfinic acid, benzenesulfonic acid amide and the like; they are known as antifoggants or stabilizers.

For more details, a reference can be made to E. J. Birr, 'Stabilization of Photographic Silver Halide Emulsions', Focal Press 1974.

Examples of the usable compounds include those thiazolium salts described in, for example, U.S. Pat. Nos. 2,131,038, 2,694,716, etc.; those azaindenes described in U.S. Pat. Nos. 2,886,437, 2,444,605. etc.; those urazoles described in U.S. Pat. No.3,287,135; those sulfocatechols described in U.S. Pat. No. 3,236,632; those oximes described in British Patent No. 623,448; those mercaptotetrazoles described in U.S. Pat. Nos. 2,403,927, 3,266,897, 3,397,987, etc.; nitron; nitroindazoles; those polyvalent metal salts described in U.S. Pat. No. 2,839,403; those thuronium salts described in U.S. Pat. No. 3,220,839; and those salts of palladium, platinum and gold described in U.S. Pat. Nos. 2,566,263, 2,597,715, etc.; and the like.

The light-sensitive material of this invention may contain in the hydrophilic colloid layer thereof a water-soluble dye as a filter dye, antiirradiation dye or antihalation dye or for various other purposes. Examples of such dyes include oxonol dyes, hemioxonol dyes, styryl dyes, merocyanine dyes, cyanine dyes and azo dyes. Among these dyes, the useful ones include, for example, oxonol dyes, hemioxonol dyes and merocyanine dyes.

In the light-sensitive material of this invention, where the hydrophilic colloid layer thereof contains a dye or ultraviolet absorbing agent, it may be mordanted by a cationic polymer or the like therefor.

As for such dyes, "Absorbing and Filter Dyes" described in Research Disclosure vol. 176, pp. 23–26, may also be used.

For the purpose of increasing sensitivity and/or contrast or accelerating development, the photographic emulsion layers of a photographic light-sensitive material of this invention, may contain, for example, polyalkylene oxides or the derivatives thereof such as the ethers, esters or amines thereof, thioether compounds, thiomorpholines, quaternary ammonium salt compounds, urethane drivatives, urea derivatives, imidazole derivatives, 3-pyrazolidones, or the like.

Gelatin may be advantageously used as the binder or protective colloid for the hydrophilic colloid layers such as the emulsion layers, intermediate layers, protective layers and the like of the light-sensitive materials of this invention, but different hydrophilic colloid materials other than gelatin may also be used alone or in combination with gelatin.

Where gelatin is used in practicing this invention, the gelatin may be either limed or acid-treated one. Details of the manufacture of gelatin are found in Arthur Vise, the "Macromolecular Chemistry Of Gelatin" (Academic Press, 1964). Usable examples of the foregoing hydrophilic colloids include proteins such as, e.g., gelatin derivatives, graft polymers of gelatin with other macromolecular materials, albumin, casein, etc.; cellulose derivatives such as hydroxyethyl cellulose, carboxymethyl cellulose, cellulose sulfates, etc., and sugar derivatives such as sodium alginate, starch derivatives, etc.; and various synthetic hydrophilic macromolecular materials including homo- or co-polymers such as polyvinyl alcohols, partially acetalated polyvinyl alcohols, poly-N-vinylpyrolidones, polyacrylic acids, polymethacrylic acids, polyacrylamides, polyimidazoles, polyvinylpyrazoles. etc.; and the like.

The photographic light-sensitive materials of this invention may contain in the photographic emulsion layer and other hydrophilic colloid layers thereof an inorganic or organic hardening agent, examples of which include, e.g., chromium salts such as chrome alum, chromium acetate; aldehydes such as formaldehyde, glyoxal, glutaraldehyde; N-methylol compounds such as dimethylol urea, methyloldimethyl-hydantoin; dioxane derivatives such as 2,3-dihydroxydioxane; active vinyl compounds such as 1,3,5-triacryloyl-hexahydro- 2-triazine, 1,3-vinylsulfonyl-2-propanol; active halogen compounds such as (2,4-dichloro-6-hydroxy-3-triazine), mucohalogenic acids such as mucochloric acid, mucophenoxychloric acid; and the like. These may be used independently or in combination.

The photographic light-sensitive material of this invention may contain in the photographic emulsion layer or other hydrophilic colloid layers thereof water-insoluble or less-soluble synthetic polymer-dispersed products for the purpose of improving dimensional stability or the like, examples of which products include, e.g., alkyl (meth)acrylates, alkoxyalkyl (meth)acrylates, glycidyl (meth)acrylates, (meth)acrylamides, vinyl esters such as vinyl acetate; acryl nitrile, olefins, styrenes, and the like, which may be used alone or in combination, and also include polymers comprised of those monomers constituting the combination of any of these materials with acrylic acid, methacrylic acid, $\alpha,\beta$-unsaturated dicarboxylic acid, hydroxyalkyl (meth-)acrylates, sulfoalkyl (meth)acrylates, styrenesulfonic acid, and the like.

In the silver halide photographic light-sensitive material of this invention, a protective layer may be suitably provided. The protective layer is a hydrophilic colloid layer, for which hydrophilic colloid may be used those exemplified previously. The protective layer may be either a single layer or superposed layers.

The silver halide photographic light-sensitive material of this invention may contain in the emulsion layer or protective layer, preferably in the protective layer, a matting agent and/or smoothing agent. Suitably usable examples of the matting agent are those organic compounds like water-dispersible vinyl polymers such as polymethylmethacrylate having appropriate grain sizes (of from 0.3 to 5 $\mu$m, or of not less than twice the thickness of the protective layer, particularly preferably not less than four times the thickness) or inorganic compounds such as silver halide, strontium-barium sulfate, and the like. The smoothing agent not only is useful for and has similar effects to the matting agent in preventing sticking trouble but also is effective in improving the friction property in connection with the adaptability of movie film to movie cameras or projectors. Useful examples of the smoothing agent include waxes such as liquid paraffin, higher fatty acids. etc., polyfluorinated hydrocarbons or derivatives thereof, polyalkyl-polysiloxanes, polyaryl-polysiloxanes, polyalkylaryl-polysiloxanes, silicones such as alkylene-oxide-addition derivatives of these compounds, and the like.

The photographic light-sensitive material of this invention may, if necessary, use various other additives, such as dyes, development accelerators, brightening agents, anticolor-stain agents, ultraviolet absorbing agents, and the like. To be concrete, those as described in Research Disclosure, vol. 176. pp. 22–31 (RD-17643, 1978) may be used.

The silver halide photographic light-sensitive materials of this invention may further be provided, if necessary, with the layers such as an antihalation layer, intermediate layer, filter layer, and the like.

The photographic light-sensitive materials of this invention may be completed by having the photographic emulsion layers and other layers thereof coated on one side of or both sides of an erastic support material commonly used in ordinary photographic light-sensitive materials. Useful materials for the elastic support include films comprised of semisynthetic or synthetic high polymers such as cellulose nitrate, cellulose acetate, polystyrene, polyvinyl chloride, polyethylene terephthalate, polycarbonate, etc., or papers on which is coated or laminated a baryta layer or $\alpha$-olefin polymer (such as polyethylene, polypropylene, ethylene/butene copolymer), or the like. The support may be colored with a dye or a pigment. The surface of the support is generally subbed in order to improve the adherence thereof to the photographic emulsion layer. The surface of the support may be subjected to corona discharge treatment, ultraviolet ray irratiation, flame treatment or the like, before or after the subbing treatment. To be concrete, those as disclosed in Research Disclosure vol. 176, p. 25, Item "Supports" may be used.

In the photographic light-sensitive material of this invention, the photographic emulsion layer or other hydrophilic colloid layers may be coated on a support or on other layers by any of various coating methods, such as the dipping coating method, roller coating method, curtain coating method, extrusion coating method, and the like. To be more concrete, those methods such as described in Research Disclosure vol. 176, pp. 27–28, Item "Casting Procedures" may be used.

The silver halide photographic light-sensitive material may apply, to be concrete, to light-sensitive materials for X-ray use, lithographic light-sensitive materials, black-and-white photographic light-sensitive materials, color negative light-sensitive materials, color reversal light-sensitive materials, color photographic papers, colloid transfer process, silver salt diffusion transfer process, dye transfer process, silver-dye bleaching process, print-out light-sensitive materials, thermal-development-type light-sensitive materials, and the like.

Exposure to be made for obtaining photographic images may be made in usual manner; by using any of various light sources including, e.g., natural light such as sunlight, tungsten light, fluorescent lamp light, mercury vapor lamp light, xenon arc light, carbon arc light, xenon flash light, cathode-ray-tube flying spot, light-emitting diode, laser beams such as those of gas laser, YAG laser, dye laser, semiconductor laser, etc. Exposure may also be made to the light emitted from a phosphor excited by electron beams, X rays, $\gamma$ rays, $\alpha$ rays, and the like. Exposure time may be much than 1/1000 second such as $1/10^4$ to $1/10^6$ second by using, e.g., a xenon flash or cathode-ray tube or much longer than one second, not to speak of one second to 1/1000 second usually used in ordinary type cameras. The spectral composition of the light to be used in exposure may be adjusted by using at need a proper color filter. The photographic processing of the light-sensitive material of this invention may be carried out by the application of any of those various methods and various processing solutions such as described in, e.g., Research Disclosure, vol. 176, pp. 25–30 (RD-17643). The silver halide photographic light-sensitive materials of the invention may be photographically processed, according to purposes, in any one of the photographic processes for reproducing silver images, i.e., a black-and-white photographic process or a photographic process for reproducing dye images, i.e., a color photographic process.

In particular, the photographic processes suitable for the silver halide photographic light-sensitive materials of the invention include a black-and-white photographic process in which the whole processing time is from 20 to 60 seconds in the case of using an automatic processor.

In such a black-and-white process as metioned above, a developing step, a fixing step and a washing step are carried out. There may be some instances where a washing step may be omitted if a stabilizing step is to be applied after the completion of a developing step or both of a stopping step and a fixing step. It is also allowed to carry out a developing step with an independent alkaline solution, provided that a color developing agent or the precursors thereof are incorporated into a light-sensitive material to be processed, and it is further allowed to carry out a developing step in which a lith developer is used as the developer.

The black-and-white developers which may be used in a black-and-white process include, for example, those so-called a primary black-and-white developer which may usually be used in the well-known processes applicable to color photographic light-sensitive materials, and those which may be used in the processes applicable to black-and-white photographic light-sensitive materials. They are also allowed to contain a variety of additives which may generally be added to black-and-white developers.

The typical examples of the additives include developing agents such as 1-phenyl-3-pyrazolidone, Metol and hydroquinone; preservatives such as a sulfite; processing accelerator comprising an alkali substance such as those of sodium hydroxide, sodium carbonate, potassium carbonate and so forth; inorganic or organic inhibitors such as potassium bromide, 2-methylbenzimidazole, methylbenzthiazole and so forth; hard-water softeners such as a polyphosphate; such an excessive surface-development inhibitor comprising a small amount of an iodide or a mercapto compound; and so forth.

The above-mentioned developers are of the aqueous alkaline solutions each containing, independently or in combination, ordinary type black-and-white photographic developing agents including, for example, hydroquinone; an alkyl hydroquinone such as t-butyl hydroquinone, methyl hydroquinone and dimethyl hydroquinone; a catechol; a pyrazole; a chlorohydroquinone; Dichlorohydroquinone; an alkoxy hydroquinone such as a methoxy or ethoxy hydroquinone; an aminophenol developing agent such as an N-methyl-p-aminophenol and a 2,4-diaminophenol; an ascorbic acid developing agent; an N-methyl-p-aminophenol sulfate: a pyrazolone such as 4-aminopyrazolone; a 3-pyrazolidone developing agent such as 1-phenyl-5-pyrazolidone, 1-phenyl-4,4-dimethyl-3-pyrazolidone, 1 -phenyl-5-methyl-3-pyrazolidone, 1-phenyl-4-methyl-3-pyrazolidone, 1,5-diphenyl-3-pyrazolidone, 1-p-tolyl-3-pyrazolidone, 1-phenyl-2-acetyl-4,4-dimethyl-3-pyrazolidone, 1-p-hydroxyphenyl-4,4-dimethyl-3-pyrazolidone, 1-(2-benzothiazolyl)-3-pyrazolidone and 3-acetoxy-i-phenyl-3-pyrazolidone; and so forth.

Among the above, a combination of hydroquinone and a 3-pyrazolidone or an aminophenol is particularly useful for a rapid process at a high-temperature.

The developers which may be used preferably in the invention are also allowed to contain a hardening agents.

As for such hardening agents, a dialdehyde type hardening agents may preferably be used therein. They include, for example, a $\beta$-methyl glutaraldehyde, a glutaraldehyde, an $\alpha$-methyl glutaraldehyde, a maleic glutaraldehyde, a succinic dialdehyde, a methoxysuccinic dialdehyde, an $\alpha,\alpha$-dimethyl glutaraldehyde, a methylmaleic dialdehyde, a methylsuccinic dialdehyde, an $\alpha$-methyl-$\beta$-ethoxy glutaraldehyde, an $\alpha$-n-butoxy glutaraldehyde, an $\alpha$-ethyl-$\beta$-ethoxy glutaraldehyde, a $\beta$-n-butoxy glutaraldehyde, an $\alpha,\alpha$-dimethoxysuccinic dialdehyde, a $\beta$-isopropoxysuccinic dialdehyde, an $\alpha,\alpha$-diethylsuccinic dialdehyde, and butylmaleic aldehyde.

The above-mentioned dialdehyde type hardening agents may ordinarily be used in an amount of from 1 to 20 g per liter of a processing liquid used and, more preferably, from 3 to 5 g.

If required, such developers are also allowed to contain perservatives including, for example, alkali-metal sulfites such as sodium sulfite, a potassium sulfite, potassium metahydrogensulfite and so forth; buffers such as a carbonate, boric acid, a borate and an alkanolamine; an alkalizing agent such as a hydroxide and carbonate; dissolution assistants such as a polyethylene glucol and the esters thereof; pH adjusting agents including organic acids such as acetic acid; sensitizers such as a quaternary ammonium salt; development accelerators; surface active agents; and so forth.

The above-mentioned developers are further allowed to contain antifogging agents including, for example, benzotriazoles such as 5-nitroindazole, 5-nitro-benzimidazole, 5-methyl-benzotriazole and 5-nitrobenzotriazole; tetrazoles or thiazoles such as benzothiazole or 1-phenyl-5-mercaptotetraazole, or the compounds such as described in British Patent No. 1,269,268; and chelating agents such as ethylenediaminetetraacetic acid, the alkali-metal salts thereof, a polyphosphate and a nitriloacetate.

A pH value of the developer prepared as mentioned above may be so selected as to satisfactorily render the desired density and contrast and such a pH value is so adjusted as to be within the range of from about 8 to 12 and, particularly, from about 9.0 to 10.5.

The temperature and time applied to a development process are correlated to each other and will be determined in relation to a total processing period of time. In the invention, they are preferably, for example, at a temperature of from 30° to 40° C. for a time of from 10 to 20 seconds.

The fixers are the aquous solutions each containing a water-soluble aluminium compound having a pH value of about 3.8 to 5.0 at 20° C. In the methods of the invention, a stopping step may be inserted after the developing step. However, such a stopping step is generally omitted from the processes using a roller-transport type automatic processor, in which, therefore, a developer is brought into a fixer, so that the pH value of the fixer will be raised. Accordingly, it is, desired to adjust the pH value of a fixer between about 3.8 and 4.6 at 20° C.

The fixers are those of a thiosulfate such as ammonium thiosulfate, a sodium thiosulfate or the like and, in particular, ammonium thiosulfate is preferable from the viewpoint of a fixing rate. The amount of the fixers used may suitably be varied and, generally, within the range of from about 0.1 to 5 mol per liter.

In such a fixer, the aqueous aluminium-salt solutions which mainly serve as a hardening agent are the compounds which are popularly known as the hardening agents of an acid fixer with hardener, including, for example, aluminium chloride, aluminium sulfate, potassium alum and so forth. In the invention, the preferable temperature and time in a fixing step are, for example, at a temperature of from 20° to 35° C. and for a time of from 4 to 15 seconds.

According to the methods of the invention, a photographic material having been developed and fixed will then be washed and dried. Such a washing step is to be carried out for almost completely removing silver salts dissolved by the prior fixing step. The preferable washing temperature and time are at a temperature of about 20° to 50° C. and for a time of from 5 to 12 seconds.

Such a drying step may be carried out at a temperature of from about 40° to 100° C. and the drying time may suitably be varied according to the conditions of atmosphere, however, the drying step may be allowed to carry out, normally, for a time of from about 5 to 15 seconds.

There is no special limitation to the types of automatic processors which may preferably be used to embodying the invention and capable of processing within a time of from 20 to 60 seconds, but any automatic processors of a roller-transport type, a belt-transport type and so forth and, more preferably, those of the roller-transport type may preferably be used.

The silver halide photographic light-sensitive material of this invention has effects as shown in the following (1) through (6):

(1) The light-sensitive material can be subjected to a super-rapid processing whose total processing time is from 20 seconds to 60 seconds, and, where processed by the super-rapid processing method, is excellent in the sensitivity, contrast, maximum density, fixability and dryability, and causes no problems of changes in the quality even by lack of washing as well as of fixation.

(2) The light-sensitive material, even when the gelatin content of the hydrophilic colloid layer on the light-sensitive silver halide emulsion layer side is small, causes little or no coating troubles such as coating marks, coating streaks, etc.

(3) The coating speed can be increased under the condition wherein the drying water content is equal per unit time, so that the productivity is improved.

(4) The light-sensitive material, where the light-sensitive silver halide thereof is sensitized by the sensitizing dye having the foregoing Formula [I], [II] or [III], is improved on the antiscratch-darkening effect, pressure-desensitization resistance, graininess and antidye-staining effect in addition to the above-mentioned effects.

(5) The light-sensitive silver halide emulsion layer, when containing silver iodobromide grains of the foregoing multistrata structure, shows effects further excellent in the sensitivity as well as in the antiscratch-darkening effect.

(6) Where the hydrophilic colloid layer on the light-sensitive silver halide emulsion side is comprised of two or more layers and when the surface tension of the coating liquid thereof meets the foregoing conditions, the coating trouble mentioned in the above (2) can be reduced further.

EXAMPLES

The present invention will be illustrated further in detail by the following examples:

EXAMPLE 1

A silver iodobromide emulsion containing 3.0 mole % silver iodide was first prepared by the full ammoniacal normal precipitation. The obtained emulsion was of an average grain size of 1.00 μm and was regarded herein as E-I. To Emulsion E-I were added chloroaurate, sodium thiosulfate, and ammonium thiocyanate to thereby effect the optimum gold-sulfur sensitization of the emulsion. The emulsion was then stabilized by using 4-hydroxy-6-methyl-1,3,3a,7-tetrazaindene, and subsequently the gelatin concentration thereof was adjusted so as to be of the gelatin quantities as given in Table 1.

The emulsion was coated along with a hardening agent-added protective layer prepared as given in Table 1 simultaneously superposedly by the slide hopper coating method on both sides of a subbed polyester film support in the order of the silver halide emulsion layer and then protective layer from the support side, whereby Samples No. 1 through No. 19 were obtained. The amount of silver was 55 mg/m$^2$.

The amount of the hardening agent in each of these samples was adjusted so that the melting time is about 30 minutes when measured by the following method:

That is, the time interval of from the beginning of the immersion of a sample cut into 1 cm×2 cm size in an aqueous 1.5% sodium hydroxide solution up to the time when the emulsion begins to dissolve out was regarded as melting time.

The coating speed, in order to equalize the drying amount of water per unit time, was varied according to the wet thickness. The faster the coating speed the better from the stand-point of productivity.

The thus obtained samples each was measured with respect to coating troubles thereof, such as coating streaks, coating marks and so forth, and the number and degrees thereof were measured to be rated into 5 grades of from 1 (inferior) to 5 (superior). Those rated 3 to 5 have no problem, but those of 1 and 2 are ones unacceptable for practical use.

The sensitivity measurement was made as follows: Each sample was placed between a pair of optical wedges with their density inclinations placed face-to-face mirror-symmetrically, and it was exposed through the wedges simultaneously for 1/12.5 second to light having a color temperature of 5,400° K. in the same amount from light sources illuminating it from both directions.

Each sample was processed in the following steps with a roller-transport type automatic processor and the whole processing period of time of which was 45 seconds.

| | Processing temperature | Processing time |
|---|---|---|
| Insertion | — | 1.2 seconds |
| Developing + crossover | 35° C. | 14.6 seconds |
| Fixing + crossover | 33° C. | 8.2 seconds |
| Washing + crossover | 25° C. | 5.7 seconds |
| Squeeze | 40° C. | 5.7 seconds |
| Drying | 45° C. | 8.1 seconds |
| Total | — | 45.0 seconds |

The developer used was XD-90, and the fixer was XF (both are products of Konishiroku Photo Industry Co., Ltd.).

From the obtained characteristic curve of each sample the exposure at the point of base density+fog density+1.0 was found, and the relative speed of each sample was obtained on the basis thereof.

The dryability of each sample was rated as follows: Namely, the sample that was subjected to the 45-second processing and has come out of the drying section was collectively rated with respect to the touch and the degree of scratches, etc., in comparison with other samples into 5 grades of from 1 (inferior) to 5 (superior). Those of from 3 to 5 have no problem, but those of 1 and 2 are unacceptable for practical use.

Some of the samples were also processed in the above 45-second automatic processor with its line speed down to half (½) to thereby obtain the sensitivity thereof in the conventional 90-second processing. The results obtained in above are given in Table 2.

As is apparent from Table 2, the samples for the present invention have satisfactory coatability and collectively excellent in the sensitivity, productivity (i.e., a coating speed to equalize the drying amount of water pr unit time) and dryability, and thus they are found to be highly adaptable to the super-rapid processing.

In comparison with the conventional 90-second process, despite the sensitivity of each of the samples for this invention being equal to or more than that of the conventional system (Sample No. 1), the processing time thereof can be reduced to half, and therefore it is understood that the processability of the samples for this invention is doubled.

TABLE 1

| | Silver halide emulsion layer | | | | | | Protective layer | | | | | |
|---|---|---|---|---|---|---|---|---|---|---|---|---|
| | | Amt of | Surfactant | | | | Amt of | Surfactant | | | | |
| Sample No. | Em Name | gelatin ($g/m^2$ per side) | Exemplified No. | Amt ($g/m^2$ per side) | Surface tension (dyne/cm) | Wet thickness (μm) | gelatin ($g/m^2$ per side) | Exemplified No. | Amt ($g/m^2$ per side) | Surface tension (dyne/cm) | Wet thickness (μm) | |
| 1 | E-1 | 2.15 | 1-10 | $2 \times 10^{-4}$ | 35 | 72 | 1.10 | 2-28 | $2 \times 10^{-3}$ | 26 | 18 | Comparative |
| 2 | " | " | " | " | " | 57 | " | " | " | " | " | " |
| 3 | " | 2.00 | " | " | " | 72 | " | " | " | " | " | " |
| 4 | " | " | " | " | " | 57 | " | " | " | " | " | Invention |
| 5 | " | " | " | " | " | 47 | " | " | " | " | " | " |
| 6 | " | 1.60 | " | " | " | 72 | " | " | " | " | " | Comparative |
| 7 | " | " | " | " | " | 62 | " | " | " | " | " | Invention |
| 8 | " | " | " | " | " | 52 | " | " | " | " | " | " |
| 9 | " | " | " | " | " | 42 | " | " | " | " | " | " |
| 10 | " | " | " | " | " | 32 | " | " | " | " | " | " |
| 11 | " | " | " | " | " | 12 | " | " | " | " | " | Comparative |
| 12 | " | 1.20 | " | $3 \times 10^{-4}$ | 34 | 69 | 1.00 | " | $5 \times 10^{-3}$ | 25 | 16 | " |
| 13 | " | " | " | " | " | 54 | " | " | " | " | " | Invention |
| 14 | " | " | " | " | " | 24 | " | " | " | " | " | " |
| 15 | " | " | " | " | " | 14 | " | " | " | " | " | Comparative |
| 16 | " | 1.10 | " | " | " | 69 | " | " | " | " | " | " |
| 17 | " | " | " | " | " | 54 | " | " | " | " | " | " |
| 18 | " | " | " | " | " | 24 | " | " | " | " | " | " |
| 19 | " | " | " | " | " | 14 | " | " | " | " | " | " |

| Sample No. | Em Name | Total amt of gelatin ($g/m^2$ per side) | Difference in surface tension (Em layer - Protective layer) (dyne/cm) | Total wet layer thickness (μm) | Wet thickness ratio Em. layer: Protective layer | |
|---|---|---|---|---|---|---|
| 1 | E-1 | 3.25 | 9 | 90 | 8:2 | Comparative |
| 2 | " | " | " | 75 | 7.6:2.4 | " |
| 3 | " | 3.10 | " | 90 | 8:2 | " |
| 4 | " | " | " | 75 | 7.6:2.4 | Invention |
| 5 | " | " | " | 65 | 7.2:2.8 | " |
| 6 | " | 2.70 | " | 90 | 8:2 | Comparative |
| 7 | " | " | " | 80 | 7.8:2.2 | Invention |

TABLE 1-continued

| | | | | | | |
|---|---|---|---|---|---|---|
| 8 | " | " | " | 70 | 7.4:2.6 | " |
| 9 | " | " | " | 60 | 7:3 | " |
| 10 | " | " | " | 50 | 6.4:3.6 | " |
| 11 | " | " | " | 30 | 4:6 | Comparative |
| 12 | " | 2.20 | " | 85 | 8.1:1.9 | " |
| 13 | " | " | " | 70 | 7.7:2.3 | Invention |
| 14 | " | " | " | 40 | 6:4 | " |
| 15 | " | " | " | 30 | 4.7:5.3 | Comparative |
| 16 | " | 2.10 | " | 85 | 8.1:1.9 | " |
| 17 | " | " | " | 70 | 7.7:2.3 | " |
| 18 | " | " | " | 40 | 6:4 | " |
| 19 | " | " | " | 30 | 4.7:5.3 | " |

TABLE 2

| Sample No. | Sensitivity 45-second processing | Sensitivity 90-second processing | Coating marks grade | Coating speed (m/min.) | Dry-ability grade |
|---|---|---|---|---|---|
| 1 | 95 | 110 | 5 | 78 | 2 |
| 2 | 95 | " | " | 94 | " |
| 3 | 110 | 125 | " | 78 | 3 |
| 4 | " | " | " | 94 | " |
| 5 | " | " | " | 108 | " |
| 6 | 140 | 155 | " | 78 | 4 |
| 7 | " | " | " | 88 | " |
| 8 | " | " | " | 100 | " |
| 9 | " | " | " | 117 | " |
| 10 | " | " | 4 | 140 | " |
| 11 | " | " | 2 | 233 | " |
| 12 | 155 | 165 | 4 | 82 | 5 |
| 13 | " | " | " | 100 | " |
| 14 | " | " | " | 175 | " |
| 15 | " | " | 3 | 233 | " |
| 16 | 160 | 170 | 2 | 82 | " |
| 17 | " | " | " | 100 | " |
| 18 | " | " | " | 175 | " |
| 19 | " | " | 1 | 233 | " |

EXAMPLE 2

The preparation of multistrata structure-having silver halide grains-containing emulsions E2 to E6 will be described as follows: An ammoniacal silver nitrate solution and a solution containing potassium bromide and 2.0 mole % potassium iodide, with the temperature, pAg and pH thereof being kept at 45° C., 11.0 and 9.0, respectively, were added by the double-jet method to an aqueous gelatin solution. The addition was gradually accelerated with the growth of the grains.

The obtained emulsion was a monodisperse emulsion of octahedral silver halide grains with an average grain size of 0.65 μm. To this emulsion, serving as a core, were further added by the double-jet method ammoniacal silver nitrate and potassium bromide solutions under the conditions of pAg=11.0 and pH=9.0 to thereby form pure silver bromide shells. It was an emulsion of octahedral monodisperse grains with an average grain size of 0.70 μm. This emulsion was regarded as E-2.

Subsequently, emulsions of octahedral silver iodobromide grains containing 5 mole %, 10 mole %, 25 mole % and 40 mole % silver iodide, respectively, were prepared in nearly the same manner as in E-2 except that the proportion of the potassium bromide to the potassium iodide was varied, the core grain size was varied so as to make the average silver iodide content after the formation of the shell uniform, and the adding speed in the initial stage of the mixing was controlled so as to equalize the grain sizes. The following process took place in quite the same manner as in E-2 to thereby prepare octahedral grains-having emulsions of an average grain size of 0.70 μm, which were regarded as E-3, E-4, E-5 and E-6, respectively. E-I and E-2 through E-6 were chemically sensitized and coated in the same manner as in Example-1 except that the sensitizing dye given in Table 3 was added to the emulsions before the chemical sensitization, whereby Samples No. 20 to No. 41 were obtained, provided that the emulsions each was prepared with an amount of silver of 4 mg/dm$^2$ and with gelatin in the same amount as in Example-1 as shown in Table 3. The obtained samples are as given in Table 3.

These samples were evaluated in the same manner as in Example-1. And the RMS granularity was measured in the following manner: The sample containing no sensitizing dye was sandwiched in sheets of Intensifying Screen NS for regular film use (manufactured by Konishiroku Photo Industry Co., Ltd.) and each of those samples containing the sensitizing dye was sandwiched in sheets of Intensifying Screen KO-250 for orthochromatic film use (manufactured by Konishiroku Photo Industry Co., Ltd.), and each sandwiched sample was exposed through an aluminum wedge for 0.10 second to X rays under the conditions of a tube voltage of 90 KVP and a tube current of 100 mA, and then subjected to the foregoing 45-second processing. Subsequently, the portion of a density of 1.0 of the emulsion layer on the side facing toward the X-ray generator was peeled apart, while the emulsion layer on the other side was measured by means of a one-touch-type RMS Measuring Instrument (manufactured by Konishiroku Photo Industry Co., Ltd.) with its aperture size of 50×200 μm. The smaller the obtained value the more excellent.

Measurements of the pressure desensitization and scratch darkening were made by the following methods:

As for the pressure desensitization, each sample was conditioned for 5 hours at 23° C. with 35% RH, and then, under the condition, was bent about 280° with a radius of curvature of 2 cm. Three minutes after the bending, each sample was exposed through an optical wedge for 1/10 second to the light from a tungsten lamp as a light source, and then developed.

And the pressure desensitization was expressed as the density difference ΔD between the density of the desensitized portion in the initial density of 1.0 and the not-bent portion having the density of 1.0. Namely, the smaller the value the smaller the pressure desensitization.

On the other hand, as for the scratch darkening, each sample, after being conditioned at 23° C. with 55% RH for 4 hours, was scratched continuously by a 0.3-mil-radius-point-having sapphire needle with its load being varied, and then developed. The scratch darkening was expressed as the load (g) applied at the point where darkening began. That is, the smaller the value (g) the weaker the scratch darkening.

As is apparent from Table 4, these samples for this invention and having a silver halide emulsion layer containing the silver iodobromide grains of the foregoing specific multistrata structure and optically sensitized by the sensitizing dye having the foregoing general formula are excellent in the coatability, high in the productivity, and also collectively excellent in the sensitivity, dryability, granularity, pressure resistance, and the like, and therefore they are highly suitable for the super-rapid processing.

In comparison with the conventional 90-second processing, despite the sensitivity equal to or more than that of the conventional system (Sample No. 1), the processing period of time of these samples for this invention can be shortened to half, and therefore the processability thereof is understood to be doubled.

TABLE 3

| | Silver halide emulsion layer | | | | | | Protective layer | | | | | |
|---|---|---|---|---|---|---|---|---|---|---|---|---|
| | | Amt of | Surfactant | | | | Amt of | Surfactant | | | | |
| Sample No. | Em Name | gelatin ($g/m^2$ per side) | Exemplified No. | Amt ($g/m^2$ per side) | Surface tension (dyne/cm) | Wet thickness (μm) | gelatin ($g/m^2$ per side) | Exemplified No. | Amt ($g/m^2$ per side) | Surface tension (dyne/cm) | Wet thickness (μm) | |
| 20 | E-1 | 2.15 | 1-5 | $2 \times 10^{-4}$ | 35 | 72 | 1.10 | 2-81 | $2 \times 10^{-3}$ | 27 | 18 | Comparative |
| 21 | E-2 | 1.55 | " | " | " | 49 | " | " | " | " | 16 | Invention |
| 22 | E-3 | " | " | " | " | " | " | " | " | " | " | " |
| 23 | E-4 | " | " | " | " | " | " | " | " | " | " | " |
| 24 | E-5 | " | " | " | " | 72 | " | " | $4 \times 10^{-4}$ | 30 | 18 | Comparative |
| 25 | " | " | " | " | " | " | " | " | $7 \times 10^{-4}$ | 29 | " | " |
| 26 | " | " | " | " | " | " | " | " | $2 \times 10^{-3}$ | 27 | " | " |
| 27 | " | " | " | " | " | 62 | " | " | $4 \times 10^{-4}$ | 30 | " | Invention |
| 28 | " | " | " | " | " | " | " | " | $7 \times 10^{-4}$ | 29 | " | " |
| 29 | " | " | " | " | " | " | " | " | $2 \times 10^{-3}$ | 27 | " | " |
| 30 | " | " | " | " | " | " | " | " | $4 \times 10^{-3}$ | 25 | " | " |
| 31 | " | " | " | " | " | 49 | " | " | $4 \times 10^{-4}$ | 30 | 16 | " |
| 32 | " | " | " | " | " | " | " | " | $7 \times 10^{-4}$ | 29 | " | " |
| 33 | " | " | " | " | " | " | " | " | $2 \times 10^{-3}$ | 27 | " | " |
| 34 | " | " | " | " | " | " | " | " | $4 \times 10^{-3}$ | 25 | " | " |
| 35 | " | " | " | " | " | 34 | " | " | $2 \times 10^{-3}$ | 27 | " | " |
| 36 | " | " | " | " | " | " | " | " | $4 \times 10^{-3}$ | 25 | " | " |
| 37 | " | 2.15 | " | " | " | 49 | " | " | $4 \times 10^{-4}$ | 30 | " | Comparative |
| 38 | " | " | " | " | " | " | " | " | $7 \times 10^{-4}$ | 29 | " | " |
| 39 | " | " | " | " | " | " | " | " | $2 \times 10^{-3}$ | 27 | " | " |
| 40 | " | " | " | " | " | " | " | " | $4 \times 10^{-3}$ | 25 | " | " |
| 41 | E-6 | 1.55 | " | " | " | " | " | " | $2 \times 10^{-3}$ | 27 | " | Invention |

| Sample No. | Em Name | Total amt of gelatin ($g/m^2$ per side) | Difference in surface tension (Em layer - Protective layer) (dyne/cm) | Total wet layer thickness (μm) | Wet thickness ratio Em. layer: Protective layer | Sensitizing dye | | |
|---|---|---|---|---|---|---|---|---|
| | | | | | | Exemplified No. | Adding amount (mg/mol AgX) | |
| 20 | E-1 | 3.25 | 8 | 90 | 8:2 | — | — | Comparative |
| 21 | E-2 | 2.65 | " | 65 | 7.5:2.5 | Cpd (2) | 130 | Invention |
| 22 | E-3 | " | " | " | " | " | " | " |
| 23 | E-4 | " | " | " | " | " | " | " |
| 24 | E-5 | " | 5 | 90 | 8:2 | " | " | Comparative |
| 25 | " | " | 6 | " | " | " | " | " |
| 26 | " | " | 8 | " | " | " | " | " |
| 27 | " | " | 5 | 80 | 7.8:2.2 | " | " | Invention |
| 28 | " | " | 6 | " | " | " | " | " |
| 29 | " | " | 8 | " | " | " | " | " |
| 30 | " | " | 10 | " | " | " | " | " |
| 31 | " | " | 5 | 65 | 7.5:2.5 | " | " | " |
| 32 | " | " | 6 | " | " | " | " | " |
| 33 | " | " | 8 | " | " | " | " | " |
| 34 | " | " | 10 | " | " | " | " | " |
| 35 | " | " | 6 | 50 | 6.8:3.2 | " | " | " |
| 36 | " | " | 10 | " | " | " | " | " |
| 37 | " | 3.25 | 5 | 65 | 7.5:2.5 | " | " | Comparative |
| 38 | " | " | 6 | " | " | " | " | " |
| 39 | " | " | 8 | " | " | " | " | " |
| 40 | " | " | 10 | " | " | " | " | " |
| 41 | E-6 | 2.65 | 8 | " | " | " | " | Invention |

TABLE 4

| Sample No. | Sensitivity 45-second processing | Sensitivity 90-second processing | Coating marks grade | Coating speed (m/min.) | Dryability grade | R.M.S. granularity | Pressure desensitization | Scratch darkening (g) |
|---|---|---|---|---|---|---|---|---|
| 20 | 60 | 70 | 4 | 78 | 2 | 0.0021 | 0.18 | 27 |
| 21 | 110 | 125 | 5 | 108 | 4 | 0.0014 | 0.07 | 47 |
| 22 | 115 | 130 | " | " | " | " | 0.07 | 48 |
| 23 | 125 | 135 | " | " | " | " | 0.08 | 50 |
| 24 | 130 | 140 | 4 | 78 | " | " | 0.08 | 53 |
| 25 | " | " | 5 | " | " | " | " | " |

TABLE 4-continued

| Sample No. | Sensitivity 45-second processing | Sensitivity 90-second processing | Coating marks grade | Coating speed (m/min.) | Dry-ability grade | R.M.S. granu-larity | Pressure desensi-tization | Scratch darken-ing (g) |
|---|---|---|---|---|---|---|---|---|
| 26 | " | " | 5 | " | " | " | " | " |
| 27 | " | " | 4 | 88 | " | " | " | " |
| 28 | " | " | 4 | " | " | " | " | |
| 29 | " | " | 5 | " | " | " | " | " |
| 30 | " | " | 5 | " | " | " | " | " |
| 31 | " | " | 3 | 108 | " | " | " | " |
| 32 | " | " | 4 | " | " | " | " | " |
| 33 | " | " | 5 | " | " | " | " | " |
| 34 | " | " | 5 | " | " | " | " | " |
| 35 | " | " | 3 | 140 | " | " | " | " |
| 36 | " | " | 5 | " | " | " | " | " |
| 37 | 90 | 105 | 3 | 108 | 2 | 0.0013 | 0.07 | 60 |
| 38 | " | " | 4 | " | " | " | " | " |
| 39 | " | " | 5 | " | " | " | " | " |
| 40 | " | " | 5 | " | " | " | " | " |
| 41 | 138 | 143 | 5 | " | 4 | 0.0014 | 0.09 | 55 |

EXAMPLE 3

Emulsions of octahedral silver iodobromide grains comprising core grains prepared in the same manner as in E-3 to E-6 and containing mole %, 10 mole %, 25mole % and 40 mole % silver iodide, respectively, were prepared. On each of the grains was formed a shell in the same manner as in E-2 except that the shell contains 1.0 mole % silver iodide, whereby octahedral monodisperse emulsions having an average grain size of 0.70 μm were prepared. The emulsions were regarded as E-7, E-8, E-9 and E-10, respectively.

These emulsions were chemically sensitized, spectrally sensitized and then coated in the same manner as in Example-2, whereby Samples No. 42 through No. 49 were obtained.

These samples were evaluated in the same manner as in Example-2. The results are given in Table 5.

As is apparent from Table 5, these samples for this invention and having a light-sensitive silver halide emulsion layer containing silver iodobromide grains of the foregoing specific multistrata structure are collectively excellent in the coatability, productivity, sensitivity, granularity, pressure-desensitization resistance, antiscratch-darkening effect, and the like, and also high in the sensitivity particularly when spectrally sensitized by the sensitizing dye having the foregoing general formula. And in comparison with the conventional 90-second processing, despite of the sensitivity equal to or more than that of the conventional system (Sample No. 42) the processing time can be reduced to half, and therefore the processability is doubled.

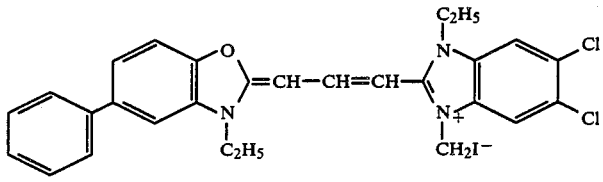

Comparative Dye (1)

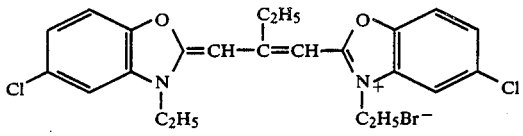

Comparative Dye (2)

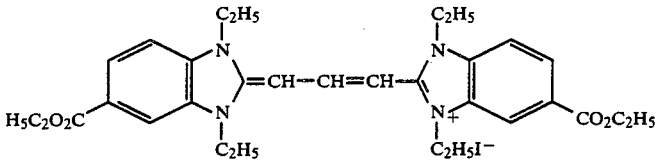

Comparative Dye (3)

TABLE 5

| Sample No. | Em Name | Silver halide emulsion layer: Amt of gelatin (g/m² per side) | Surfactant: Exem-pli-fied No. | Surfactant: Amt (g/m² per side) | Surface tension (dyne/cm) | Wet thick-ness (μm) | Protective layer: Amt of gelatin (g/m² per side) | Surfactant: Exem-pli-fied No. | Surfactant: Amt (g/m² per side) | Surface tension (dyne/cm) | Wet thick-ness (μm) | |
|---|---|---|---|---|---|---|---|---|---|---|---|---|
| 42 | E-1 | 2.15 | 2-34 | $1 \times 10^{-4}$ | 35 | 75 | 1.10 | 2-33 | $1 \times 10^{-3}$ | 27 | 15 | Comparative |
| 43 | E-7 | 1.45 | " | " | " | 45 | " | " | " | " | " | Invention |
| 44 | E-8 | " | " | " | " | " | " | " | " | " | " | " |
| 45 | E-9 | " | " | " | " | " | " | " | " | " | " | " |

TABLE 5-continued

| | | | | | | | | | | | | |
|---|---|---|---|---|---|---|---|---|---|---|---|---|
| 46 | " | " | " | " | " | " | " | " | " | " | " | " |
| 47 | " | " | " | " | " | " | " | " | " | " | " | " |
| 48 | " | " | " | " | " | " | " | " | " | " | " | " |
| 49 | E-10 | " | " | " | " | " | " | " | " | " | " | " |

| Sample No. | Em Name | Total amt of gelatin ($g/m^2$ per side) | Difference in surface tension (Em layer - Protective layer) (dyne/cm) | Total wet layer thickness (μm) | Wet thickness ratio Em. layer: protective layer | Sensitizing dye: Exemplified No. | Sensitizing dye: Adding amount (mg/mol AgX) | |
|---|---|---|---|---|---|---|---|---|
| 42 | E-1 | 3.25 | 5 | 90 | 8.3:1.7 | — | — | Comparative |
| 43 | E-7 | 2.55 | 8 | 60 | 7.5:2.5 | Cpd. (44) | 400 | Invention |
| 44 | E-8 | " | " | " | " | " | " | " |
| 45 | E-9 | " | " | " | " | " | " | " |
| 46 | " | " | " | " | " | Comp. dye (1) | " | " |
| 47 | " | " | " | " | " | Comp. dye (2) | " | " |
| 48 | " | " | " | " | " | Comp. dye (3) | " | " |
| 49 | E-10 | " | " | " | " | Cpd. (43) | " | " |

TABLE 6

| Sample No. | Sensitivity: 45-second processing | Sensitivity: 90-second processing | Coating marks grade | Coating speed (m/min.) | Dry-ability grade | R.M.S. granularity | Pressure desensitization | Scratch darkening (g) |
|---|---|---|---|---|---|---|---|---|
| 42 | 95 | 110 | 4 | 78 | 2 | 0.0021 | 0.18 | 27 |
| 43 | 120 | 135 | 5 | 108 | 4 | 0.0014 | 0.08 | 45 |
| 44 | 130 | 145 | " | " | " | " | 0.08 | 50 |
| 45 | 135 | 150 | " | " | " | " | 0.08 | 55 |
| 46 | 100 | 115 | " | " | " | " | " | " |
| 47 | 100 | 115 | " | " | " | " | " | " |
| 48 | 95 | 115 | " | " | " | " | " | " |
| 49 | 140 | 153 | " | " | " | " | 0.09 | 57 |

EXAMPLE 4

Under the controlled conditions of 60° C., pAg=8.0 and pH=2.0, a 2.0 mole % silver iodide-containing silver iodobromide cubic grains-having emulsion of an average grain size of 0.20 μm was obtained by the double-jet method. Part of this emulsion was used as the core to be grown as follows: That is, to the solution containing the core grains and gelatin were added by the double-jet method an ammoniacal silver nitrate solution and a solution containing potassium iodide and potassium bromide under the conditions of 40° C., pAg=8.0 and pH=9.5, whereby a first coat containing 5 mole %, 10 mole %, 25 mole % or 40 mole % silver iodide was formed over the core. Each of the respective emulsions was then subjected to the same treatment as in E-2 except that pAg was adjusted to 9.0 to thereby form a pure silver bromide second coat over the above first coat-formed grain, whereby cubic monodisperse grains having silver iodobromide emulsions of an average grain size of 0.60 μm were prepared, which were regarded as E-11, E-12, E-13 and E-14, respectively. The average silver iodide content of these emulsions was all 3.0 mole %.

These emulsions each was chemically sensitized, optically sensitized and coated in the same manner as in Example-2, whereby Samples No. 50 to No. 54 were obtained.

The contents of these samples are given in Table 7.

These samples were evaluated in the same manner as in Example 2, and the results are shown in Table 8.

As is apparent from Table 8, these samples for this invention and having a light-sensitive silver halide emulsion layer containing silver iodobromide grains of the foregoing specific multistrata structure and sensitized by the sensitizing dye having the foregoing general formula are collectively excellent in the coatability, productivity, sensitivity, granularity, pressure-desensitization resistance, antiscratch-darkening effect, and the like. In comparison with the conventional 90-second processing, despite the density equal to or more than that of the conventional system (Samples No. 50 and No. 43) the processing time can be shortened to half, and, therefore, the processability is understood to be doubled.

TABLE 7

| Sample No. | Em Name | Silver halide emulsion layer: Amt of gelatin ($g/m^2$ per side) | Surfactant: Exemplified No. | Surfactant: Amt ($g/m^2$ per side) | Surface tension (dyne/cm) | Wet thickness (μm) | Protective layer: Amt of gelatin ($g/m^2$ per side) | Surfactant: Exemplified No. | Surfactant: Amt ($g/m^2$ per side) | Surface tension (dyne/cm) | Wet thickness (μm) | |
|---|---|---|---|---|---|---|---|---|---|---|---|---|
| 50 | E-1 | 2.15 | 1-10 | $2 \times 10^{-4}$ | 35 | 75 | 1.10 | 2-80 | $2 \times 10^{-3}$ | 27 | 15 | Comparative |
| 51 | E-11 | 1.45 | " | " | " | 45 | " | " | " | " | " | Invention |
| 52 | E-12 | " | " | " | " | " | " | " | " | " | " | " |
| 53 | E-13 | " | " | " | " | " | " | " | " | " | " | " |

TABLE 7-continued

| | | | | | | | | | | | | |
|---|---|---|---|---|---|---|---|---|---|---|---|---|
| 54 | E-14 | " | " | " | " | " | " | " | " | " | " | " |

| Sample No. | Em Name | Total amt of gelatin (g/m² per side) | Difference in surface tension (Em layer - Protective layer) (dyne/cm) | Total wet layer thickness (μm) | Wet thickness ratio Em. layer: protective layer | Sensitizing dye Exemplified No. | Sensitizing dye Adding amount (mg/mol AgX) | |
|---|---|---|---|---|---|---|---|---|
| 50 | E-1 | 3.25 | 5 | 90 | 8.3:1.7 | — | — | Comparative |
| 51 | E-11 | 2.55 | 8 | 60 | 7.5:2.5 | Cpd. (74) | 90 | Invention |
| 52 | E-12 | " | " | " | " | " | " | " |
| 53 | E-13 | " | " | " | " | " | " | " |
| 54 | E-14 | " | " | " | " | " | " | " |

TABLE 8

| Sample No. | Sensitivity 45-second processing | Sensitivity 90-second processing | Coating marks grade | Coating speed (m/min.) | Dryability grade | R.M.S. granularity | Pressure desensitization | Scratch darkening (g) |
|---|---|---|---|---|---|---|---|---|
| 50 | 95 | 110 | 4 | 78 | 2 | 0.0021 | 0.18 | 27 |
| 51 | 130 | 145 | 5 | 108 | 4 | 0.0012 | 0.06 | 50 |
| 52 | 140 | 155 | " | " | " | " | " | 52 |
| 53 | 145 | 160 | " | " | " | " | " | 57 |
| 54 | 148 | 163 | " | " | " | " | 0.07 | 60 |

EXAMPLE 5

Each of these samples obtained in Example-4 was subjected to 30-second processing by making faster the line speed of the automatic processor. The results are shown in Table 9.

As is apparent from Table 9, these samples for this invention, even in the 30-second processing, each shows a sensitivity equal to or more than that of the conventional system (Sample No. 50 processed for 90 seconds), has no problem in the dryability and is suitably usable in the 30-second process, and it is understood that the use of such the light-sensitive material allows reducing the processing time in the conventional system to ⅓, and therefore the processability is tripled.

TABLE 9

| Sample No. | Sensitivity 30-second processing | Sensitivity 90-second processing | Dryability grade |
|---|---|---|---|
| 50 | 70 | 110 | 1 |
| 51 | 110 | 145 | 3 |
| 52 | 120 | 155 | 3 |
| 53 | 125 | 160 | 3 |
| 54 | 128 | 163 | 3 |

What is claimed is:

1. A process for manufacturing a silver halide photographic element, comprising the strep of coating at least one coating layer on at least one side of a support, each said coating layer having a wet thickness of from 35 μm to 80 μm, said at least one coating layer forming at least one hydrophilic colloid layer at least one of which is a silver halide emulsion layer, said at least one hydrophilic colloid layer having a total gelatin content from 2.20 g/m² to 3/10 g/m² per side of said support and a silver halide content of not more than 3.5 g/m² per side of said support in terms of silver.

2. The process of claim 1, wherein said wet thickness of each said coating layer is within the range of from 40 μm to 70 μm.

3. The process of claim 2, wherein said wet thickness of each said coating layer is within the range of from 45 μm to 70 μm.

4. The process of claim 3, wherein said total gelatin content of said at least one hydrophilic colloid layer is in an amount of from 2.40 g/m² per side of said support.

5. The process of claim 4, wherein said total gelatin content of said at least one hydrophilic colloid layer is in an amount of from 2.50 g/m² to 2.80 g/m² per side of said support.

6. The process of claim 4, wherein said silver halide content of said at least one hydrophilic colloid layer is in an amount of from 1.5 g/m² to 3 g/m² per side of said support, in terms of silver.

7. The process of claim 6, wherein said silver halide content of said at least one hydrophilic colloid layer is in an amount of from 2.0 g/m² to 2.8 g/m² per side of said support, in terms of silver.

8. The process of claim 1, wherein said photographic element is formed with an outer hydrophilic colloid coating layer and at least one silver halide emulsion layer located between said support and said outer layer.

9. The process of claim 8, wherein a ratio of said wet thickness of said silver halide emulsion layer to that of said outer hydrophilic colloid coating layer is within the range of from 6:4 to 9:1.

10. The process of claim 1, wherein said silver halide emulsion layer contains a silver halide grain comprising substantially silver iodobromide and having a multistrata structure with a silver iodide content of san outer strata being at least 10 mole % smaller than the silver iodide content of an internal strata of said silver halide grain.

* * * * *